(12) United States Patent
Kuma et al.

(10) Patent No.: US 11,699,248 B2
(45) Date of Patent: Jul. 11, 2023

(54) IMAGE PROCESSING APPARATUS AND METHOD

(71) Applicant: Sony Corporation, Tokyo (JP)

(72) Inventors: Satoru Kuma, Tokyo (JP); Ohji Nakagami, Tokyo (JP); Koji Yano, Tokyo (JP); Tsuyoshi Kato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/734,567

(22) PCT Filed: Jun. 27, 2019

(86) PCT No.: PCT/JP2019/025558
§ 371 (c)(1),
(2) Date: Dec. 3, 2020

(87) PCT Pub. No.: WO2020/012968
PCT Pub. Date: Jan. 16, 2020

(65) Prior Publication Data
US 2021/0233278 A1   Jul. 29, 2021

(30) Foreign Application Priority Data

Jul. 11, 2018   (JP) .................................. 2018-131300

(51) Int. Cl.
*G06T 9/00* (2006.01)
*G06T 15/20* (2011.01)
*G06T 19/20* (2011.01)

(52) U.S. Cl.
CPC .............. *G06T 9/00* (2013.01); *G06T 15/205* (2013.01); *G06T 19/20* (2013.01); *G06T 2219/2016* (2013.01)

(58) Field of Classification Search
None
See application file for complete search history.

(56) References Cited

U.S. PATENT DOCUMENTS

2017/0336705 A1   11/2017   Zhou
2018/0268570 A1*  9/2018   Budagavi ................ G06T 9/001
(Continued)

FOREIGN PATENT DOCUMENTS

EP   3419295 A1   12/2018
EP   3742401 A1   11/2020
(Continued)

OTHER PUBLICATIONS

International Search Report and Written Opinion dated Sep. 24, 2019, received for PCT Application No. PCT/JP2019/025558, Filed on Jun. 27, 2019, 14 pages including English Translation and Replaced Written Opinion dated Sep. 24, 2018.

(Continued)

*Primary Examiner* — Robert Bader
(74) *Attorney, Agent, or Firm* — Xsensus LLP

(57) ABSTRACT

The present disclosure relates to an image processing apparatus and method that can prevent an increase in the load of a decoding process for encoded data in a point cloud video-based approach.
The parameters related to a plurality of point cloud models of a point cloud are transformed, a two-dimensional plane image onto which the plurality of point cloud models having the transformed parameters is projected is encoded, and a bitstream containing encoded data of the two-dimensional image and transform information that is information regarding the transform of the parameters is generated. The present disclosure can be applied to an information processing device, an image processing apparatus, an electronic apparatus, an information processing method, a program, or the like, for example.

8 Claims, 20 Drawing Sheets

(56) References Cited

U.S. PATENT DOCUMENTS

| | | | |
|---|---|---|---|
| 2019/0087979 A1* | 3/2019 | Mammou | G06T 9/001 |
| 2019/0116357 A1* | 4/2019 | Tian | H04N 19/14 |
| 2019/0199921 A1 | 6/2019 | Oh | |

FOREIGN PATENT DOCUMENTS

| | | |
|---|---|---|
| WO | 2017/126314 A1 | 7/2017 |
| WO | WO-2017142353 A1 | 8/2017 |
| WO | 2018/034253 A1 | 2/2018 |
| WO | WO-2018043905 A1 | 3/2018 |
| WO | WO-2018045108 A1 | 3/2018 |
| WO | 2019/055963 A1 | 3/2019 |
| WO | 2019/142666 A1 | 7/2019 |

OTHER PUBLICATIONS

Golla et al., "Real-time Point Cloud Compression", IEEE/RSJ International Conference on Intelligent Robots and Systems(IROS), IEEE, Sep. 28-Oct. 2, 2015, Hamburg, Germany, pp. 5087-5092.

Mekuria et al., "Design Implementation and Evaluation of a Point Cloud Codec for Tele-Immersive Video", Computer Science, IEEE Transactions on Circuits and Systems for Video Technology, 2017, pp. 1-14.

Mammou et al., Video-based and Hierarchical Approaches Point Cloud Compression, Apple Inc., ISO/IEC JTC1/SC29/WG11 m41649, Oct. 2017, Macau, China, 3 pages.

Mammou et al., "PCC Test Model Category 2 v0", 3DG, ISO/IEC JTC1/SC29/WG11 N17248, Oct. 2017, Macau, China, 11 pages.

* cited by examiner

FIG. 1

| | | | |
|---|---|---|---|
| | PLURALITY OF POINT CLOUD MODELS IS TRANSFORMED AND COMBINED INTO ONE GROUP, AND THIS GROUP IS ENCODED AND STORED INTO ONE BITSTREAM | | |
| #1 | colspan=3 | TRANSFORM OF EACH POINT CLOUD MODEL + SIGNALING OF TRANSFORM INFORMATION | |
| DETAILS OF TRANSFORM | COORDINATE TRANSFORM | colspan=2 | Shift |
| | | colspan=2 | Rotate |
| | OTHER PARAMETERS | colspan=2 | Time Stump |
| | | colspan=2 | Scale |
| | | colspan=2 | Frame Rate |
| TRANSFORM INFORMATION | colspan=3 | RATIO OF TRANSFORMED PARAMETERS | |
| | colspan=3 | DIFFERENCE IN TRANSFORMED PARAMETERS | |
| #2 | colspan=3 | PROJECTION PLANE SETTING OF EACH POINT CLOUD MODEL + SIGNALING OF PROJECTION PLANE INFORMATION | |
| PROJECTION PLANE | colspan=3 | ROTATION IN SIX ORTHOGONAL DIRECTIONS (Rotate) | |
| | colspan=3 | ADDITION OF DESIRED PROJECTION PLANE | |
| PROJECTION PLANE INFORMATION | colspan=3 | INFORMATION NECESSARY FOR IDENTIFYING PROJECTION PLANE (EACH POINT CLOUD MODEL) | |
| | colspan=3 | STORING INTO OCCUPANCY MAP | |
| #3 | colspan=3 | SEPARATION OF PLACEMENT REGION OF PATCHES OF EACH POINT CLOUD MODEL + SIGNALING OF MODEL INFORMATION | |
| PLACEMENT REGION | colspan=2 | INDEPENDENTLY DECODABLE UNIT OF ENCODING | FRAME |
| | | | SLICE |
| | | | TILE |
| MODEL INFORMATION | colspan=3 | NUMBER OF POINT CLOUD MODELS | |
| | colspan=3 | PLACEMENT REGION OF EACH POINT CLOUD MODEL | |

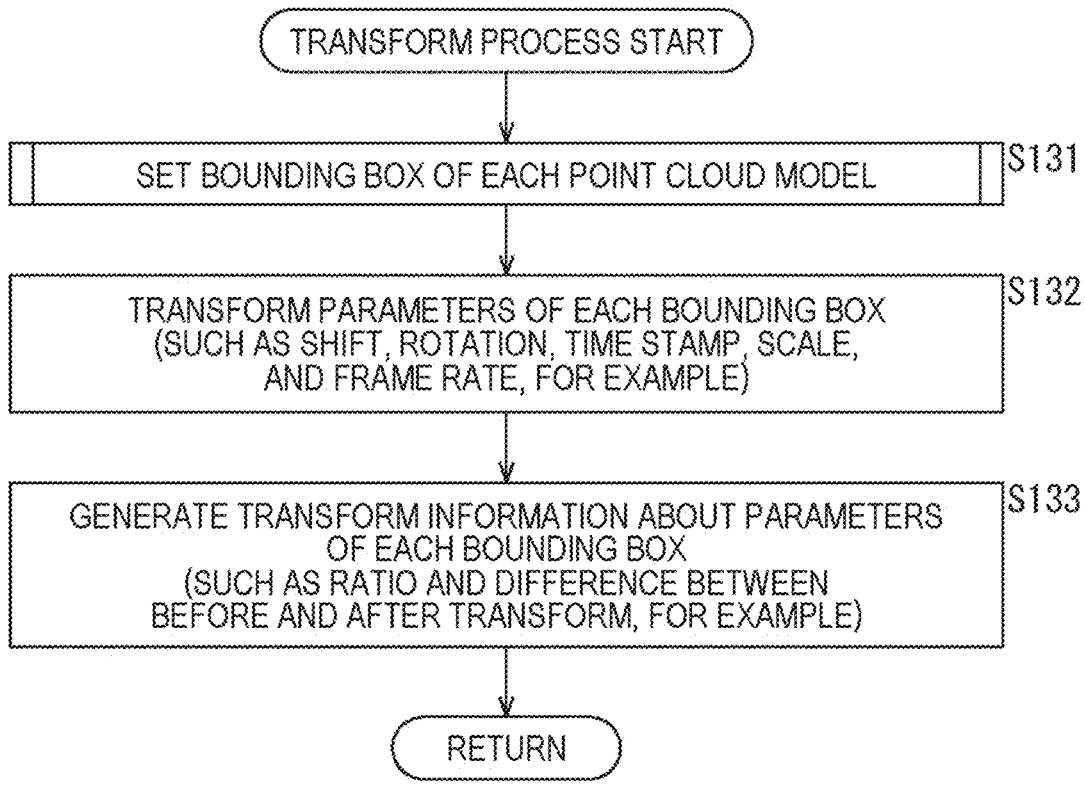
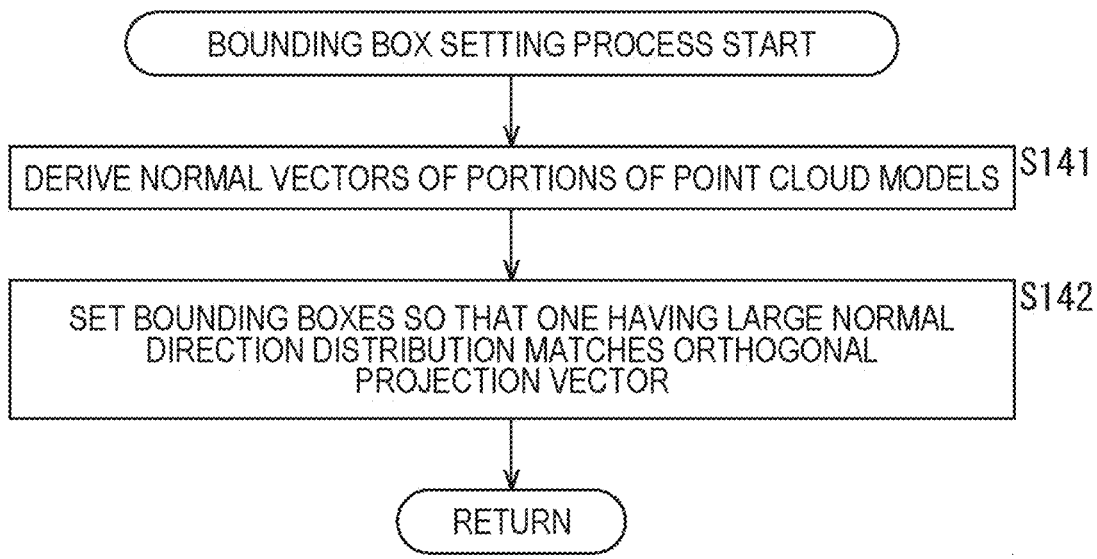

FIG. 12

| | |
|---|---|
| PERFORM LOCAL CONTROL ON POINT CLOUD MODEL PROJECTION PLANES | |
| POINT CLOUD MODEL INCLUDING SPARSE PORTIONS IS DIVIDED INTO PLURALITY OF PARTIAL POINT CLOUD MODELS, PROJECTION PLANE IS SET FOR EACH PARTIAL POINT CLOUD MODEL, AND SIGNALING OF INFORMATION ABOUT EACH PROJECTION PLANE IS PERFORMED | |
| MODEL DIVIDING | EACH DENSE POINT CLOUD IS TURNED INTO PARTIAL POINT CLOUD MODEL |
| PROJECTION PLANE | ROTATION IN SIX ORTHOGONAL DIRECTIONS (Rotate) |
| | ADDITION OF DESIRED PROJECTION PLANE |
| PROJECTION PLANE INFORMATION | INFORMATION NECESSARY FOR IDENTIFYING PROJECTION PLANE (FOR EACH PARTIAL POINT CLOUD MODEL) |
| | STORING INTO OCCUPANCY MAP |

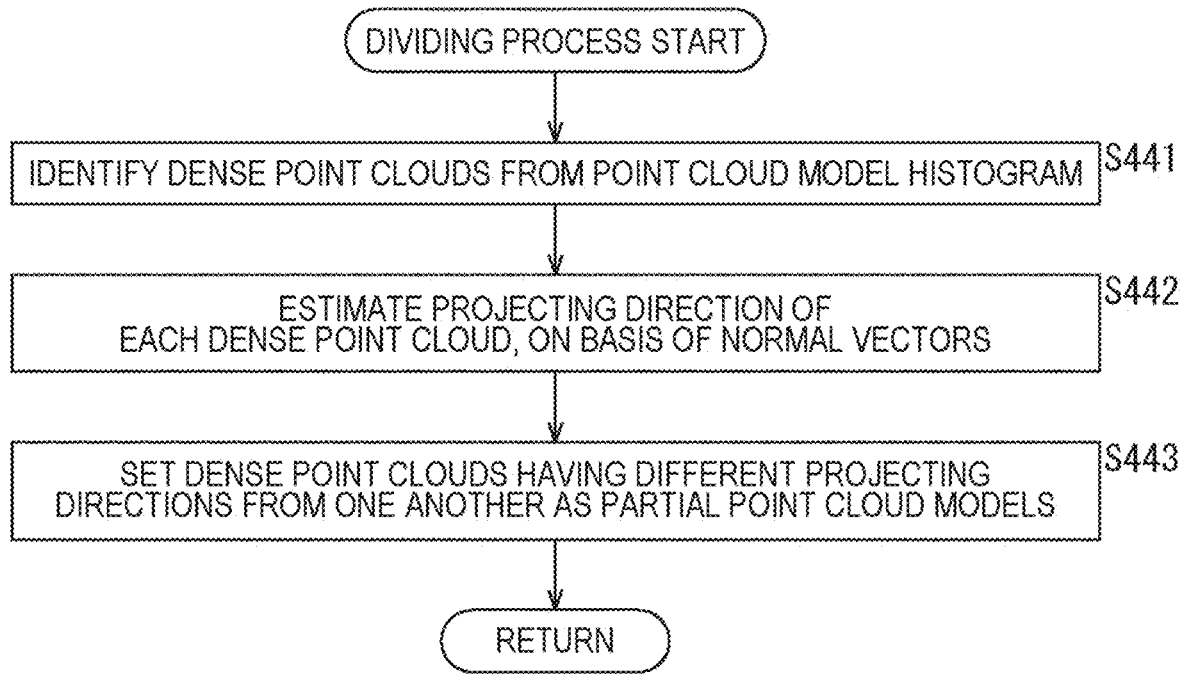
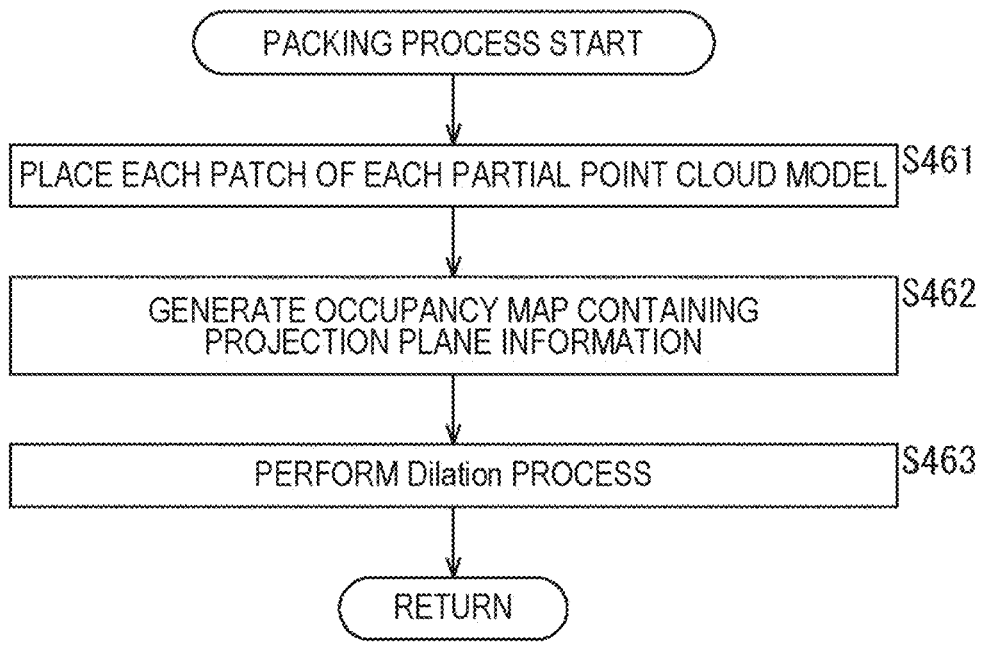

IMAGE PROCESSING APPARATUS AND METHOD

CROSS-REFERENCE TO RELATED APPLICATIONS

The present application is based on PCT filing PCT/JP2019/025558, filed Jun. 27, 2019, which claims priority to JP 2018-131300, filed Jul. 11, 2018, the entire contents of each are incorporated herein by reference.

TECHNICAL FIELD

The present disclosure relates to an image processing apparatus and method, and more particularly, to an image processing apparatus and method capable of preventing an increase in the load of a decoding process for encoded data in a video-based approach to a point cloud.

BACKGROUND ART

As a method for encoding 3D data representing a three-dimensional structure such as a point cloud, for example, there has been coding using voxels, such as Octree (see Non-Patent Document 1, for example).

In recent years, an approach has been suggested for projecting the positional and color information about a point cloud onto a two-dimensional plane on a small-region basis, for example, and encoding the positional and color information by an encoding method for two-dimensional images (hereinafter, this approach will also be referred to as a video-based approach) (see Non-Patent Documents 2 to 4, for example).

In such coding, when a plurality of point cloud models exists in a point cloud, the point cloud models are encoded independently of one another and are turned into different bitstreams from one another by a conventional method.

CITATION LIST

Non-Patent Documents

Non-Patent Document 1: R. Mekuria, Student Member IEEE, and K. Blom and P. Cesar., Members IEEE, "Design, Implementation and Evaluation of a Point Cloud Codec for Tele-Immersive Video", tcsvt_paper_submitted_february.pdf Non-Patent Document 2: Tim Golla and Reinhard Klein, "Real-time Point Cloud Compression", IEEE, 2015

Non-Patent Document 3: K. Mammou, "Video-based and Hierarchical Approaches Point Cloud Compression", MPEG m41649, October 2017

Non-Patent Document 4: K. Mammou, "PCC Test Model Category 2 v0", N17248 MPEG output document, October 2017

SUMMARY OF THE INVENTION

Problems to be Solved by the Invention

In the case of this method, however, there is a possibility that the number of instances necessary for the decoder will increase when the number of point cloud models increases.

The present disclosure has been made in view of such circumstances, and aims to prevent an increase in the number of instances necessary for decoding encoded data of a point cloud in a video-based approach, and prevent an increase in the load of the decoding process.

Solutions to Problems

An image processing apparatus of one aspect of the present technology is an image processing apparatus that includes: a transform unit that transforms a parameter related to a plurality of point cloud models of a point cloud; and an encoding unit that encodes a two-dimensional plane image onto which the plurality of point cloud models having the parameter transformed by the transform unit is projected, and generates a bitstream containing encoded data of the two-dimensional plane image and transform information that is information regarding transform of the parameter transformed by the transform unit.

An image processing method of one aspect of the present technology is an image processing method that includes: transforming a parameter related to a plurality of point cloud models of a point cloud; and encoding a two-dimensional plane image onto which the plurality of point cloud models having the parameter transformed is projected, and generating a bitstream containing encoded data of the two-dimensional plane image and transform information that is information regarding the transform of the parameter.

An image processing apparatus of another aspect of the present technology is an image processing apparatus that includes: a decoding unit that decodes a bitstream, and generates a two-dimensional plane image onto which a plurality of point cloud models is projected, and transform information that is information regarding transform of a parameter of each of the plurality of point cloud models; and a reconstruction unit that reconstructs each of the plurality of point cloud models from the two-dimensional plane image generated by the decoding unit, and, on the basis of the transform information, inversely transforms the parameter of each of the plurality of point cloud models.

An image processing method of another aspect of the present technology is an image processing method that includes: decoding a bitstream, and generating a two-dimensional plane image onto which a plurality of point cloud models is projected, and transform information that is information regarding transform of a parameter of each of the plurality of point cloud models; and reconstructing each of the plurality of point cloud models from the generated two-dimensional plane image, and, on the basis of the transform information, inversely transforming the parameter of each of the plurality of point cloud models.

An image processing apparatus of yet another aspect of the present technology is an image processing apparatus that includes: a projection unit that projects a plurality of partial point cloud models constituting a point cloud model onto projection planes that are set independently of one another; and an encoding unit that encodes a two-dimensional plane image onto which patches of the partial point cloud models projected onto the respective projection planes by the projection unit are projected, and an occupancy map containing projection plane information that is information regarding the projection planes, and generates a bitstream.

An image processing method of yet another aspect of the present technology is an image processing method that includes: projecting a plurality of partial point cloud models constituting a point cloud model onto projection planes that are set independently of one another; and encoding a two-dimensional plane image onto which patches of the partial point cloud models projected onto the respective projection planes are projected, and an occupancy map containing projection plane information that is information regarding the projection planes, and generating a bitstream.

An image processing apparatus of still another aspect of the present technology is an image processing apparatus that includes: a decoding unit that decodes a bitstream, and generates a two-dimensional plane image onto which a point cloud model is projected, and an occupancy map containing projection plane information that is information regarding a projection plane of each of a plurality of partial point cloud models included in the point cloud model; and a reconstruction unit that reconstructs the point cloud model, on the basis of the two-dimensional plane image generated by the decoding unit, and the projection plane information contained in the occupancy map.

An image processing method of still another aspect of the present technology is an image processing method that includes: decoding a bitstream, and generating a two-dimensional plane image onto which a point cloud model is projected, and an occupancy map containing projection plane information that is information regarding a projection plane of each of a plurality of partial point cloud models included in the point cloud model; and reconstructing the point cloud model, on the basis of the generated two-dimensional plane image and the projection plane information contained in the occupancy map.

In the image processing apparatus and method of one aspect of the present technology, the parameter related to a plurality of point cloud models of a point cloud is transformed, a two-dimensional plane image onto which the plurality of point cloud models having the parameter transformed is projected is encoded, and a bitstream containing the encoded data of the two-dimensional plane image and transform information that is information regarding the transform of the parameter is generated.

In the image processing apparatus and method of another aspect of the present technology, a bitstream is decoded, a two-dimensional plane image onto which a plurality of point cloud models is projected and transform information that is information regarding the transform of the parameter of each of the plurality of point cloud models are generated, each of the plurality of point cloud models is reconstructed from the generated two-dimensional plane image, and the parameter of each of the plurality of point cloud models is inversely transformed on the basis of the transform information.

In the image processing apparatus and method of yet another aspect of the present technology, a plurality of partial point cloud models constituting a point cloud model is projected onto projection planes that are set independently of one another, a two-dimensional plane image onto which patches of the partial point cloud models projected onto the respective projection planes are projected, and an occupancy map containing projection plane information that is information regarding the projection planes are encoded, and a bitstream is generated.

In the image processing apparatus and method of still another aspect of the present technology, a bitstream is decoded, a two-dimensional plane image onto which a point cloud model is projected and an occupancy map containing projection plane information that is information regarding the projection plane of each of a plurality of partial point cloud models included in the point cloud model are generated, the point cloud model is reconstructed on the basis of the generated two-dimensional plane image and the projection plane information contained in the occupancy map.

Effects of the Invention

According to the present disclosure, an image can be processed. Particularly, it is possible to prevent an increase in the load of a decoding process for encoded data in a video-based approach to a point cloud.

BRIEF DESCRIPTION OF DRAWINGS

FIG. 1 is a diagram summarizing principal features of the present technology.

FIG. 6 is a flowchart for explaining an example flow in a transform process.

FIG. 7 is a flowchart for explaining an example flow in a bounding box setting process.

FIG. 12 is a diagram summarizing principal features of the present technology.

FIG. 18 is a flowchart for explaining an example flow in a dividing process.

FIG. 19 is a flowchart for explaining an example flow in a packing process.

MODE FOR CARRYING OUT THE INVENTION

Figure 2:
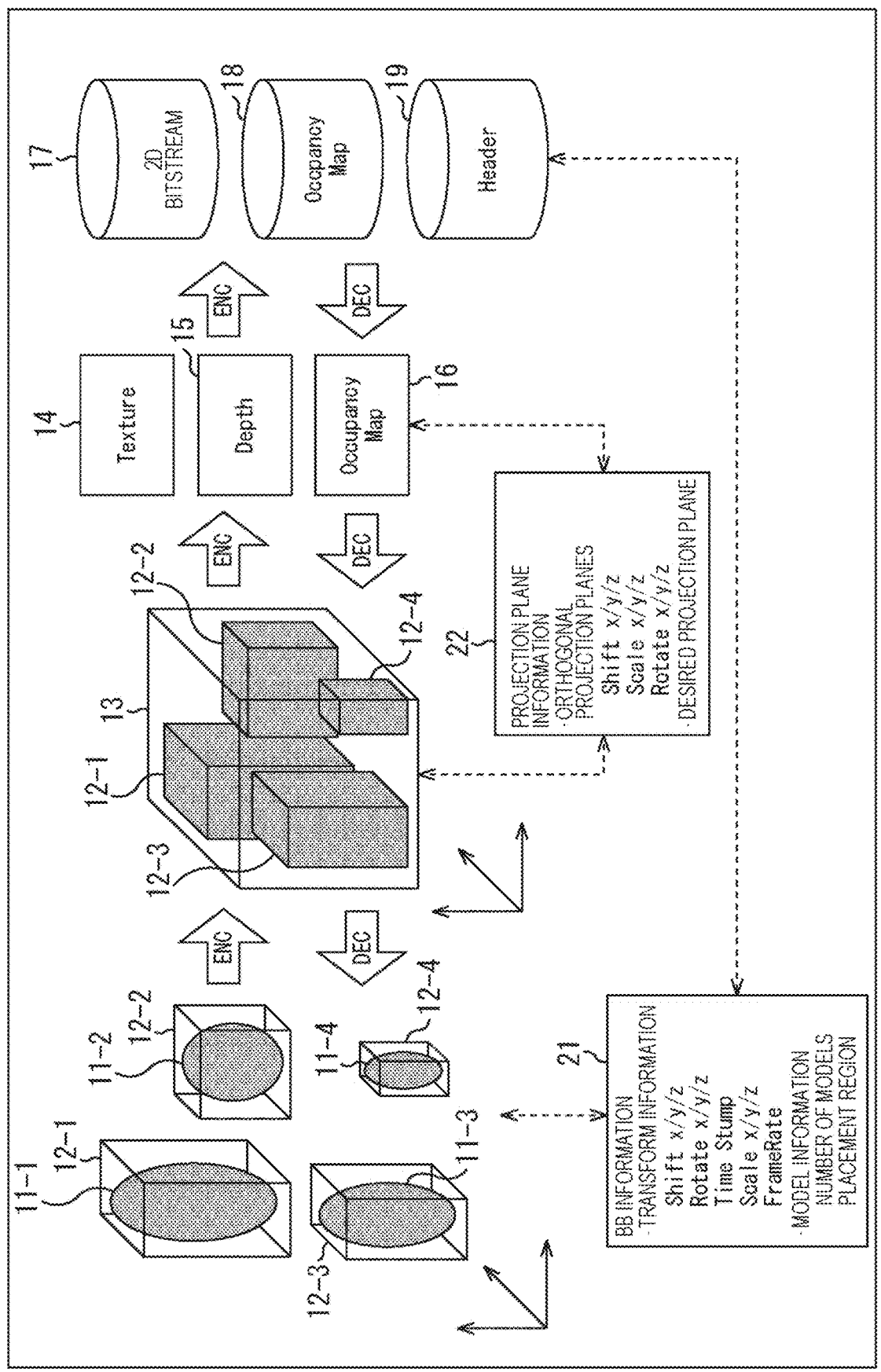
FIG. 2 is a diagram for explaining the outline of point cloud encoding and decoding to which the present technology is applied.

The following is a description of modes for carrying out the present disclosure (these modes will be hereinafter referred to as embodiments). Note that explanation will be made in the following order.

1. Transform of point cloud models
2. Partial Decoding
3. First embodiment (an encoding device)
4. Second embodiment (a decoding device)
5. Local projection plane control
6. Third embodiment (an encoding device)
7. Fourth embodiment (a decoding device)
8. Notes 1. Transform of Point Cloud Models <Documents and the Like That Support Technical Contents and Terms>

The scope disclosed in the present technology includes not only the contents disclosed in the embodiments but also the contents disclosed in the following non-patent documents that were known at the time of filing.

Non-Patent Document 1: (mentioned above)
Non-Patent Document 2: (mentioned above)
Non-Patent Document 3: (mentioned above)
Non-Patent Document 4: (mentioned above)
Non-Patent Document 5: TELECOMMUNICATION STANDARDIZATION SECTOR OF ITU (International Telecommunication Union), "Advanced video coding for generic audiovisual services", H.264, April 2017
Non-Patent Document 6: TELECOMMUNICATION STANDARDIZATION SECTOR OF ITU (International Telecommunication Union), "High efficiency video coding", H.265, December 2016
Non-Patent Document 7: Jianle Chen, Elena Alshina, Gary J. Sullivan, Jens-Rainer, and Jill Boyce, "Algorithm Description of Joint Exploration Test Model 4", JVET-G1001_v1, Joint Video Exploration Team (JVET) of ITU-T SG 16 WP 3 and ISO/IEC JTC 1/SC 29/WG 11 7th Meeting: Torino, IT, 13-21 Jul. 2017

That is, the contents disclosed in the non-patent documents listed above are also the basis for determining the support requirements. For example, when the Quad-Tree Block Structure disclosed in Non-Patent Document 6 and the Quad Tree Plus Binary Tree (QTBT) Block Structure disclosed in Non-Patent Document 7 are not directly disclosed in the embodiments, those structures are within the scope of the present technology, and satisfy the support requirements of the claims. Further, the technical terms such as parsing, syntax, and semantics are also within the scope of disclosure of the present technology, and satisfy the support requirements of the claims, even when those technical terms are not directly described, for example.

<Point Cloud>

There have been data such as point clouds that represent three-dimensional structures with positional information, attribute information, and the like about point clouds, and meshes that are formed with vertices, edges, and planes, and define three-dimensional shapes using polygonal representations.

For example, in the case of a point cloud, a three-dimensional structure is expressed as a set of a large number of points (a point cloud). That is, the data of a point cloud is formed with positional information and attribute information (colors and the like, for example) about the respective points in this point cloud. Accordingly, the data structure is relatively simple, and any desired three-dimensional structure can be expressed with a sufficiently high accuracy with the use of a sufficiently large number of points.

<Outline of a Video-Based Approach>

A video-based approach has been suggested for projecting positional and color information about such a point cloud onto a two-dimensional plane on a small-region basis, and encoding the positional and color information by an encoding method for two-dimensional images.

In this video-based approach, an input point cloud is divided into a plurality of segmentations (also called regions), and is projected onto a two-dimensional plane region by region. Note that the data of the point cloud at each position (which is the data of each point) is formed with positional information (Geometry (also referred to as Depth)) and attribute information (Texture) as described above, and is projected onto a two-dimensional plane region by region.

Each segmentation (also called a patch) projected onto the two-dimensional plane is then placed in a two-dimensional image, and is encoded by an encoding method for two-dimensional plane images, such as Advanced Video Coding (AVC) or High Efficiency Video Coding (HEVC), for example.

<Encoding of Point Cloud Models>

There are cases where such a point cloud includes a plurality of point cloud model formed with point-dense clouds. For example, when a plurality of persons is scattered in an open space, when the three-dimensional space including the entire open space is turned into a point cloud, a point-dense cloud (a point cloud model) is formed at the portion of each person. That is, a plurality of point cloud models is formed.

In such a case, if the entire point cloud is regarded as one large point cloud model and is encoded, there is a possibility that the coding efficiency will drop, because there are many portions in which points are sparse. Therefore, a method has been suggested for encoding each of the plurality of point cloud models included in a point cloud independently of one another (for each person, for example). In this case, however, a bitstream is generated for each point cloud model. Therefore, if the number of point cloud models increases, the number of bitstreams will also increase, resulting in a possibility of an increase in the number of instances necessary for the decoder. For example, when there are hundreds of point cloud models in a point cloud, there is a possibility that instances that are hundreds of times larger in number than the number of instances necessary for decoding a single bitstream will be required. Because the load of the decoding process increases in this manner, the cost of the decoder might become higher, and the processing time might become longer.

<Reduction in the Number of Bitstreams>

Therefore, a plurality of point cloud models is stored into one bitstream. For example, as shown in the top row in a table in FIG. 1, a plurality of point cloud models is transformed and is combined into a single group, and the single group is encoded, so that the plurality of point cloud models is stored into a single bitstream.

By doing so, it is possible to prevent an increase in the number of bitstreams while preventing a decrease in coding efficiency, even when a plurality of point cloud models exists in a point cloud. Accordingly, an increase in the number of instances necessary for decoding can be prevented. That is, an increase in the load of the decoding process can be prevented. Thus, an increase in the cost of the decoder can be prevented. Further, an increase in the processing time of the decoding process can be prevented.

<Transform of Point Cloud Models>

More specifically, as shown in row #1 in the table in FIG. 1, a parameter related to each point cloud model is transformed, and the point cloud models are combined into one group with fewer point-sparse portions (transform of each point cloud model). That is, the group is collectively encoded and is turned into a single bitstream.

For example, as shown in the leftmost column in FIG. 2, there are point cloud models 11-1 to 11-4 in a point cloud, and bounding boxes 12-1 to 12-4 are set for the respective point cloud models. When the point cloud models 11-1 to 11-4 are not distinguished from one another in the description, these point cloud models are referred to as the point cloud models 11. Also, when the bounding boxes 12-1 to 12-4 are not distinguished from one another in the description, these bounding boxes are referred to as the bounding boxes 12. That is, these point cloud models 11 are at a distance from one another, and a bounding box 12 is set for each of the point cloud models 11.

At the time of encoding, as shown in the second column from the left in FIG. 2, the parameters of these point cloud models 11 are transformed and gathered, to form a group with fewer point-sparse portions. In the example shown in FIG. 2, a group including the bounding boxes 12-1 to 12-4 is formed, and a bounding box 13 for encoding is set for the entire group.

The details (the parameter to be transformed) of this transform may be selected as appropriate. For example, as shown in the table in FIG. 1, the coordinates of the point cloud models 11 may be transformed. For example, as the coordinate transformation, the coordinates of the point cloud models 11 may be shifted (the positions of the point cloud models 11 may be moved). That is, each of the positions of the point cloud models 11-1 to 11-4 in the point cloud shown in the leftmost column in FIG. 2 may be spatially separated from the others. By such transform, the positions of the respective point cloud models can be brought closer to one another, for example, and thus, the sparse portions in the group can be reduced.

Also, the coordinates of the point cloud models 11 may be rotated (the postures of the point cloud models 11 may be rotated). That is, each of the postures (orientations) of the point cloud models 11-1 to 11-4 in the point cloud shown in the leftmost column in FIG. 2 may be different from the others. By such transform, the postures of the respective point cloud models can be made uniform, for example, and thus, the sparse portions in the group can be reduced.

Also, as shown in the table in FIG. 1, the times (time stamps) of the point cloud models 11 may be transformed, for example. That is, each of the positions of the point cloud models 11-1 to 11-4 in the point cloud shown in the leftmost column in FIG. 2 may be temporally separated from the others (the point cloud models may include a point cloud model existing at a different from time from the others). By such transform, the times of the respective point cloud models can be aligned, for example, and thus, the point cloud models existing at different times can be combined into one group.

Also, as shown in the table in FIG. 1, the sizes (scales) of the point cloud models 11 may be transformed, for example. That is, each of the scales of the point cloud models 11-1 to 11-4 in the point cloud shown in the leftmost column in FIG. 2 may be different from the others. By such transform, the sizes (scales) of the respective point cloud models can be made uniform, or the resolutions in a spatial direction can be made uniform, for example.

Further, as shown in the table in FIG. 1, the frame rates of the point cloud models 11 may be transformed, for example. That is, each of the frame rates of the point cloud models 11-1 to 11-4 in the point cloud shown in the leftmost column in FIG. 2 may be different from the others. By such transform, the frame rates (which are the resolutions in a temporal direction) of the respective point cloud models can be made uniform, for example.

In FIG. 2, at a time of encoding, the group of point cloud models in the bounding box 13 for encoding shown in the second column from the left is projected onto a two-dimensional plane, and is packed in video frames. In this manner, a color video frame 14 containing attribute information (Texture), a geometry video frame 15 containing positional information (Depth), and an occupancy map 16 are generated, as shown in the third column from the left.

These video frames are then encoded by an encoding method for two-dimensional images, so that a 2D bitstream 17 (including an occupancy map 18 and a header 19) is generated, as shown in the rightmost column in FIG. 2. That is, the encoded data of the point cloud models 11-1 to 11-4 is stored into this single 2D bitstream 17.

In this manner, an increase in the number of bitstreams can be prevented, and an increase in the load of the decoding process can be prevented.

<Signal of Transform Information>

In the case of decoding, the inverse process of the above is performed. That is, an inverse transform process is performed to return the respective point cloud models from the state of the group shown in the second column from the left in FIG. 2 to the original state shown in the leftmost column in FIG. 2. Therefore, to enable this inverse transform at the time of decoding, transform information indicating the details of the parameter transform performed on the point cloud models at the time of encoding (transform from the state shown in the leftmost column to the state shown in the second column from the left in FIG. 2) is generated as shown in row #1 in the table in FIG. 1, and the transform information (included in a bitstream, for example) is transmitted to the decoding side (that is, signaling of the transform information is performed).

This transform information may be any information that indicates the details of the transform (the amount of change in the transformed parameter). For example, as shown in the table in FIG. 1, the transform information may be information indicating the ratio of the transformed parameter (Shift, Rotate, Time Stamp, Scale, Frame Rate, or the like, for example) between before and after the transform. Alternatively, for example, as shown in the table in FIG. 1, the transform information may be information indicating the difference in the transformed parameter (Shift, Rotate, Time Stamp, Scale, Frame Rate, or the like, for example) between before and after the transform.

Further, any appropriate method can be used for transmitting this transform information. For example, the transform information may be associated with the bitstream containing the encoded data of the point cloud models, and be then transmitted. The transform information may be included in the bitstream, for example. As shown in FIG. 2, such transform information may be included as BB information 21 in the header 19 of the 2D bitstream 17, for example. For example, as the transform information, the RB information 21 contains information indicating a shift amount (Shift x/y/z), information indicating an amount of rotation (Rotate x/y/z), information indicating an amount of change in the time stamp (Time Stamp), information indicating an amount of change in the scale (Scale x/y/z), information indicating an amount of change in the frame rate (Frame Rate), and the like. At the time of encoding, this BB information 21 is generated and is stored into the header 19. At the time of decoding, the BB information 21 is read from the header 19 and is used for inverse transform.

<Projection Plane Setting for Point Cloud Models>

Note that, as shown in row #2 in the table in FIG. 1, when the group of point cloud models shown in the second column from the left in FIG. 2 is projected onto a two-dimensional plane, a projection plane may be set for each point cloud model. In this manner, the respective point cloud models can be projected onto more appropriate projection planes. Thus, a decrease in coding efficiency due to inefficiency in projection of the point cloud models can be prevented (coding efficiency can be increased).

For example, as shown in the table in FIG. 1, the projection planes in the six orthogonal directions of each point cloud model may be made rotatable. In this manner, the projection planes can be relatively easily made more suitable for the point cloud models (or can be turned into planes on which effective projection can be performed).

Further, as shown in the table in FIG. 1, any projection plane may be set (added). With this arrangement, the degree of freedom of the projection planes of the respective point cloud models can be increased, and more efficient projection can be expected (or a further increase in coding efficiency can be expected).

<Signal of Projection Plane Information>

Note that, when a projection plane is set for each point cloud model in this manner (when a projection plane common to the group is not set), information about the projection planes is also necessary at the time of decoding (when the point cloud is reconstructed). Therefore, as shown in row #2 in the table in FIG. 1, projection plane information that is the information regarding the projection planes set as described above is transmitted to the decoding side (signaling of projection plane information).

As shown in the table in FIG. 1, this projection plane information may contain any information that is necessary for identifying the projection planes. For example, as shown in FIG. 2, this projection plane information 22 may be stored into the occupancy map 16 (which is the occupancy map 18).

For example, the projection plane information 22 contains information indicating amounts of shift in projection planes in six orthogonal directions (Shift x/y/z), information indicating an amount of change in scale (Scale x/y/z), information indicating an amount of rotation (Rotate x/y/z), and the like. The projection plane information 22 may also contain information indicating a projection plane that is added as desired, for example.

At the time of encoding, this projection plane information 22 is generated and is stored into the occupancy map 16. At the time of decoding, the projection plane information 22 is read from the occupancy map 16, and is used for reconstructing the point cloud.

2. Partial Decoding

<Patch Placement Control for Each Point Cloud Model>

Further, as shown in row #3 in the table in FIG. 1, when the patches of each point cloud model are placed in a two-dimensional image and is packed as a video frame, the regions in which the patches are placed may be controlled for each point cloud model. For example, the patches belonging to the same point cloud model may be placed in the same region. This region may be any appropriate region. For example, this region may be an independently decodable unit of encoding. That is, the patches belonging to the same point cloud model may be placed in the same independently decodable unit of encoding.

This independently decodable unit of encoding may be any appropriate unit. For example, the unit may be a frame, a slice, or a tile, as shown in the table in FIG. 1.

Figure 3:
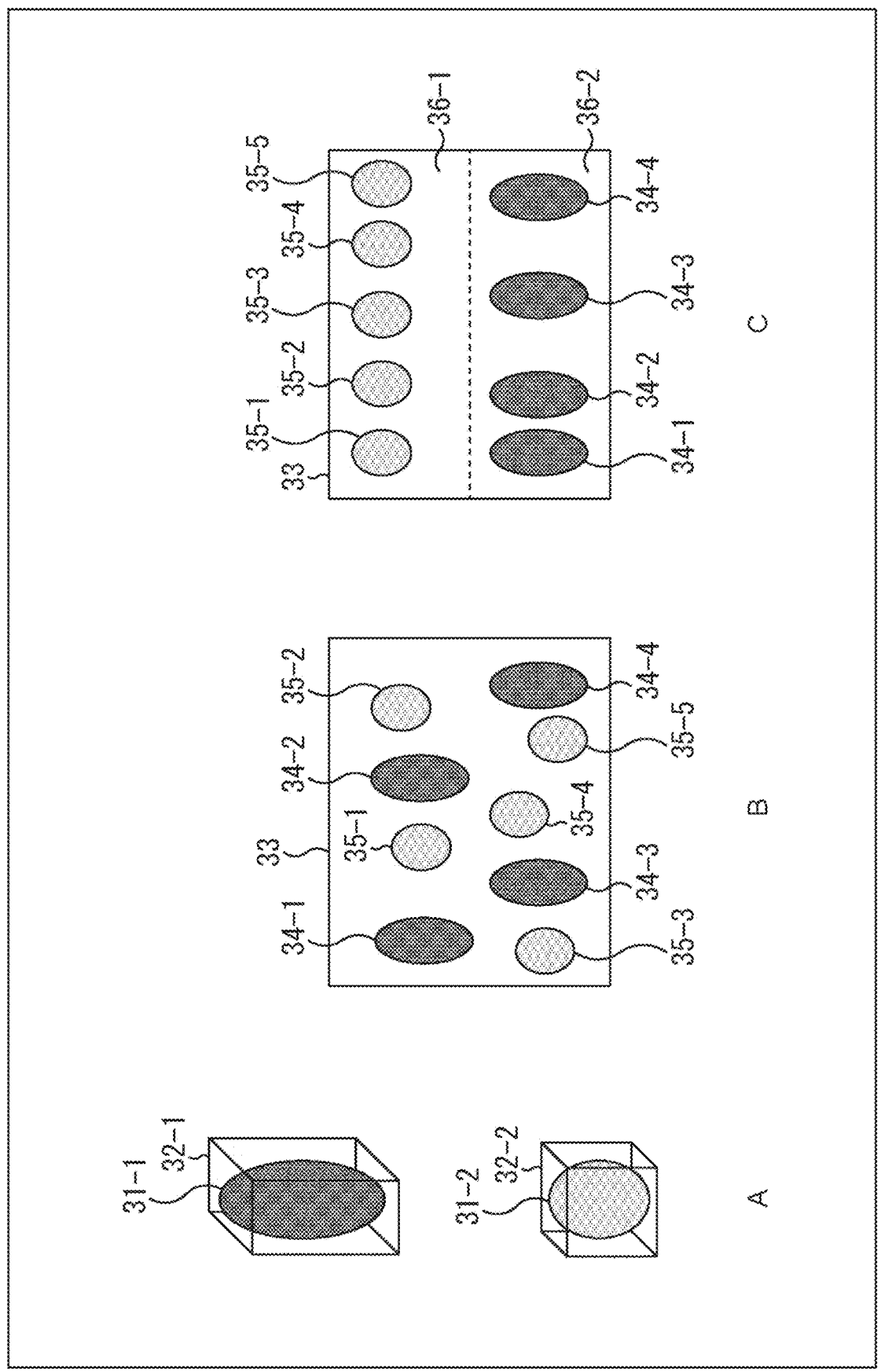
FIG. 3 is a diagram for explaining the outline of point cloud encoding and decoding to which the present technology is applied.

As shown in A of FIG. 3, a point cloud model 31-1 and a point cloud model 31-2 exist in a point cloud, for example. A bounding box 32-1 is set for the point cloud model 31-1, and a bounding box 32-2 is set for the point cloud model 31-2. That is, these point cloud models are independent of each other. When the patches of the point cloud model 31-1 and the point cloud model 31-2 are placed and packed in a two-dimensional image 33, the patches of the two point cloud models are not divided into separate regions by a conventional method, as shown in B of FIG. 3. In B of FIG. 3, patches 34-1 to 34-4 are the patches of the point cloud model 31-1, and patches 35-1 to 35-5 are the patches of the point cloud model 31-2. In C of FIG. 3, on the other hand, the patches 34-1 to 34-4 of the point cloud model 31-1 are placed in a slice 36-2 of the two-dimensional image 33, and the patches 35-1 to 35-5 of the point cloud model 31-2 are placed in a slice 36-1 of the two-dimensional image 33, for example.

As the independently decodable units of encoding in which the patches are placed are controlled for each point cloud model (the patches belonging to the same point cloud model are placed in the same independently decodable unit of encoding), it is possible to perform so-called "partial decoding" for decoding and reconstructing only one of the point cloud models. For example, in the case illustrated in C of FIG. 3, the slice 36-1 and the slice 36-2 are units of encoding that can be decoded independently of each other. Accordingly, only the patches 35-1 to 35-5 in the slice 36-1 can be decoded, or only the patches 34-1 to 34-4 in the slice 36-2 can be decoded. That is, only the point cloud model 31-1 can be decoded and reconstructed, or only the point cloud model 31-2 can be decoded and reconstructed.

<Signal of Model Information>

Note that, to perform such partial decoding, the decoding side needs to understand in which regions (independently decodable units of encoding) the patches of which point cloud models are placed. Therefore, as shown in row #3 in the table in FIG. 1, model information that is information regarding the point cloud models is generated, and is transmitted (signaled) from the encoding side to the decoding side.

This model information contains any appropriate information. For example, as shown in the table in FIG. 1, the model information may contain information indicating the number of point cloud models to be packed in a video frame. Also, as shown in the table in FIG. 1, the model information may contain information indicating the regions (independently decodable units of encoding) in which the patches of the respective point cloud models are placed, for example.

Note that this model information is transmitted by any appropriate method. For example, the model information may be associated with the bitstream containing the encoded data of the point cloud models, and be then transmitted. The model information may be included in the bitstream, for example. As shown in FIG. 2, such model information may be included as the BB information 21 in the header 19 of the 2D bitstream 17, for example.

The BB information 21 contains the model information that is information regarding the number of models and the patch placement regions of the respective point cloud models, for example. At the time of encoding, this BB information 21 is generated and is stored into the header 19. At the time of decoding, the BB information 21 is read from the header 19 and is used for partial decoding.

3. First Embodiment

<Encoding Device>

Figure 4:
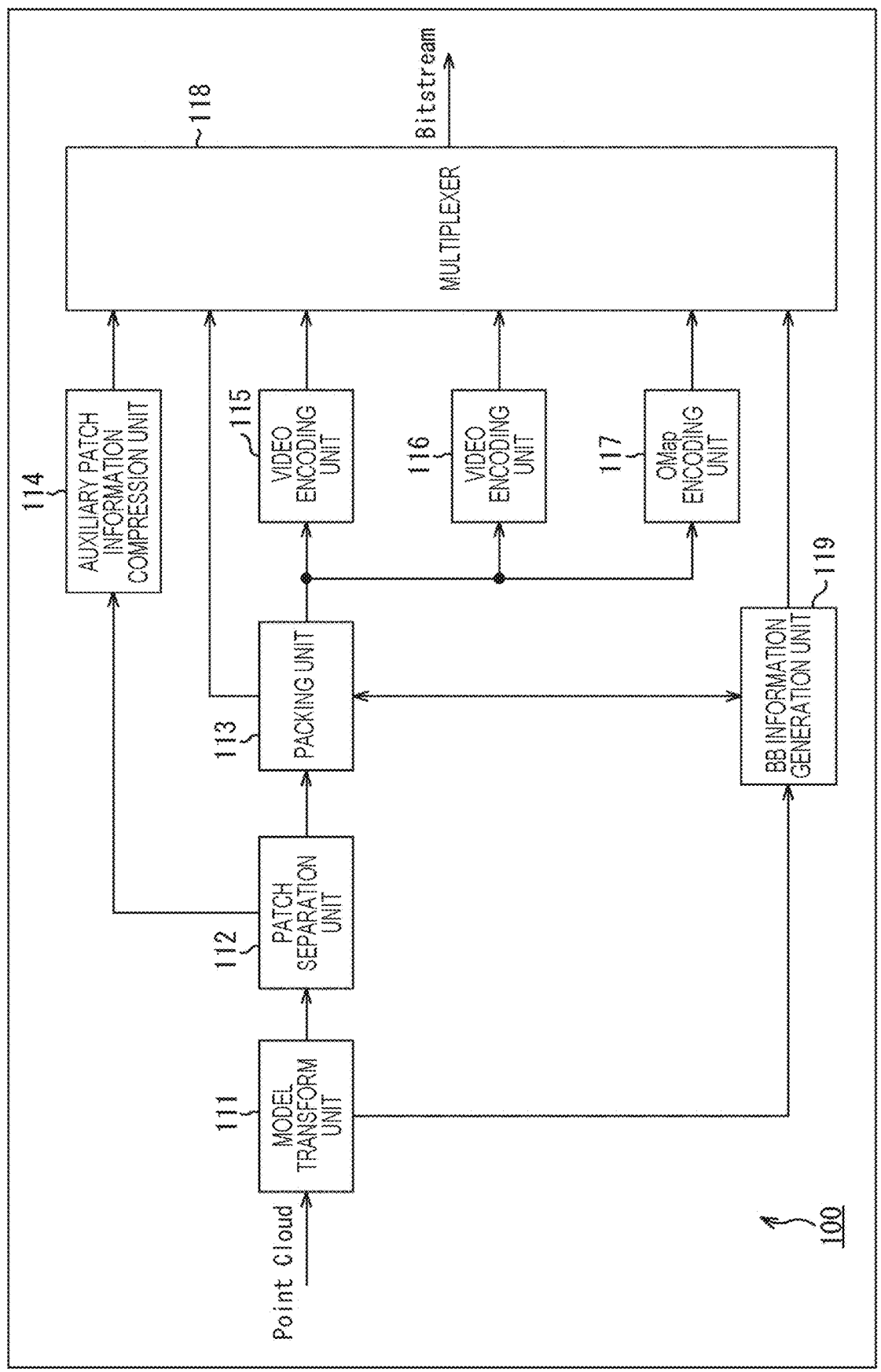
FIG. 4 is a block diagram showing a typical example configuration of an encoding device.

Next, a configuration for realizing each of the above techniques is described. FIG. 4 is a block diagram showing an example configuration of an encoding device as an embodiment of an image processing apparatus to which the present technology is applied. An encoding device 100 shown in FIG. 4 is a device that projects 3D data such as a point cloud onto a two-dimensional plane and performs encoding by an encoding method for two-dimensional images (an encoding device to which the video-based approach is applied).

Note that FIG. 4 shows the principal components and aspects such as processing units and the data flow, but does not necessarily show every aspect. That is, in the encoding device 100, there may be a processing unit that is not shown as a block in FIG. 4, or there may be a processing or data flow that is not indicated by arrows or the like in FIG. 4. This also applies to the other drawings for explaining the processing units and the like in the encoding device 100.

As shown in FIG. 4, the encoding device 100 includes a model transform unit 111, a patch separation unit 112, a packing unit 113, an auxiliary patch information compression unit 114, a video encoding unit 115, a video encoding unit 116, an OMap encoding unit 117, a multiplexer 118, and a BB information generation unit 119.

The model transform unit 111 performs a process related to parameter transform related to a point cloud model. For example, the model transform unit 111 acquires 3D data (a point cloud, for example) that is input to the encoding device 100 and indicates a three-dimensional structure. The model transform unit 111 also transforms the parameters related to the point cloud models included in the acquired point cloud. At that time, the model transform unit 111 transforms the parameters related to the respective point cloud models by the method described above in <Reduction of the Number of Bitstreams> and <Transform of Point Cloud Models>, and combines the plurality of point cloud models into one group. The model transform unit 111 supplies the patch separation unit 112 with the point cloud models whose parameters have been transformed, which are the point cloud including the point cloud models combined into one group.

The model transform unit 111 also generates transform information regarding the transform, by the method described above in <Signal of Transform Information>. The model transform unit 111 supplies the generated transform information to the BB information generation unit 119.

The patch separation unit 112 performs a process related to separation of 3D data. For example, the patch separation unit 112 acquires the point cloud (a point cloud including a plurality of point cloud models combined into one group) supplied from the model transform unit 111. The patch separation unit 112 also separates the acquired point cloud into a plurality of segmentations, projects the point cloud onto a two-dimensional plane for each segmentation, and generates patches of positional information and patches of attribute information. The patch separation unit 112 supplies information regarding each of the generated patches to the packing unit 113. The patch separation unit 112 also supplies auxiliary patch information, which is information regarding the separation, to the auxiliary patch information compression unit 114.

The packing unit 113 performs a process related to data packing. For example, the packing unit 113 acquires, from the patch separation unit 112, information regarding the patches of positional information (Geometry) indicating the positions of points, and information regarding the patches of attribute information (Texture) such as color information to be added to the positional information.

The packing unit 113 also places each of the acquired patches in a two-dimensional image, to pack the patches as a video frame. For example, the packing unit 113 arranges the patches of positional information in a two-dimensional image, to pack the patches as a video frame of positional information (also referred to as a geometry video frame). The packing unit 113 also arranges the patches of attribute information in a two-dimensional image, to pack the patches as a video frame of attribute information (also referred to as a color video frame), for example.

At the time of these packing processes, the packing unit 113 controls the region in which the patches are arranged (independently decodable units of encoding) for each point cloud model, by the method described above in <Patch Arrangement Control for Each Point Cloud Model>. The packing unit 113 then generates model information by the method described above in <Signal of Model Information>. The packing unit 113 supplies the generated model information to the BB information generation unit 119.

The packing unit 113 also generates an occupancy map associated with these video frames. The packing unit 113 further performs a dilation process on the color video frame.

The packing unit 113 supplies the geometry video frame generated in this manner to the video encoding unit 115. The packing unit 113 also supplies the color video frame generated in this manner to the video encoding unit 116. The packing unit 113 further supplies the occupancy map generated in this manner to the OMap encoding unit 117. The packing unit 113 also supplies control information regarding such packing to the multiplexer 118.

The auxiliary patch information compression unit 114 performs a process related to compression of the auxiliary patch information. For example, the auxiliary patch information compression unit 114 acquires data supplied from the patch separation unit 112. The auxiliary patch information compression unit 114 encodes (compresses) the auxiliary patch information included in the acquired data. The auxiliary patch information compression unit 114 supplies the resultant encoded data of the auxiliary patch information to the multiplexer 118.

The video encoding unit 115 performs a process related to encoding of the video frame of positional information (Geometry). For example, the video encoding unit 115 acquires the geometry video frame supplied from the packing unit 113. The video encoding unit 115 also encodes the acquired geometry video frame by an appropriate encoding method for two-dimensional images, such as AVC or HEVC, for example. The video encoding unit 115 supplies the encoded data obtained by the encoding (encoded data of the geometry video frame), to the multiplexer 118.

The video encoding unit 116 performs a process related to encoding of the video frame of attribute information (Texture). For example, the video encoding unit 116 acquires the color video frame supplied from the packing unit 113. The video encoding unit 116 also encodes the acquired color video frame by an appropriate encoding method for two-dimensional images, such as AVC or HEVC, for example. The video encoding unit 116 supplies the encoded data obtained by the encoding (encoded data of the color video frame), to the multiplexer 118.

The OMap encoding unit 117 performs a process related to encoding of the occupancy map. For example, the OMap encoding unit 117 acquires the occupancy map supplied from the packing unit 113. The OMap encoding unit 117 also encodes the acquired occupancy map by an appropriate encoding method such as arithmetic encoding, for example. The OMap encoding unit 117 supplies the encoded data obtained by the encoding (the encoded data of the occupancy map), to the multiplexer 118.

The multiplexer 118 performs a process related to multiplexing. For example, the multiplexer 118 acquires the encoded data of the auxiliary patch information supplied from the auxiliary patch information compression unit 114. The multiplexer 118 also acquires the control information regarding packing supplied from the packing unit 113. The multiplexer 118 further acquires the encoded data of the geometry video frame supplied from the video encoding unit 115. The multiplexer 118 also acquires the encoded data of the color video frame supplied from the video encoding unit 116. The multiplexer 118 further acquires the encoded data of the occupancy map supplied from the OMap encoding unit 117. The multiplexer 118 also acquires BB information supplied from the BB information generation unit 119.

The multiplexer 118 multiplexes those acquired pieces of information, to generate a bitstream (Bitstream). The multiplexer 118 outputs the generated bitstream to the outside of the encoding device 100.

The BB information generation unit 119 performs a process related to generation of BB information. For example, the BB information generation unit 119 acquires the transform information supplied from the model transform unit 111. The BB information generation unit 119 also acquires the model information supplied from the packing unit 113. The BB information generation unit 119 generates the BB information containing the acquired transform information and model information. The BB information generation unit 119 supplies the generated BB information to the multiplexer 118. That is, the BB information is transmitted to the decoding side.

With such a configuration, the encoding device 100 can transform and combine a plurality of point cloud models of a point cloud into one group, encode the group, and store the result into one bitstream. That is, even when a plurality of point cloud models exists in a point cloud, it is possible to prevent an increase in the number of bitstreams while preventing a decrease in coding efficiency. Accordingly, the encoding device 100 can prevent an increase in the number of instances necessary for decoding. That is, an increase in the load of the decoding process can be prevented. Thus, an increase in the cost of the decoder can be prevented. Further, an increase in the processing time of the decoding process can be prevented.

<Flow in an Encoding Process>

Figure 5:
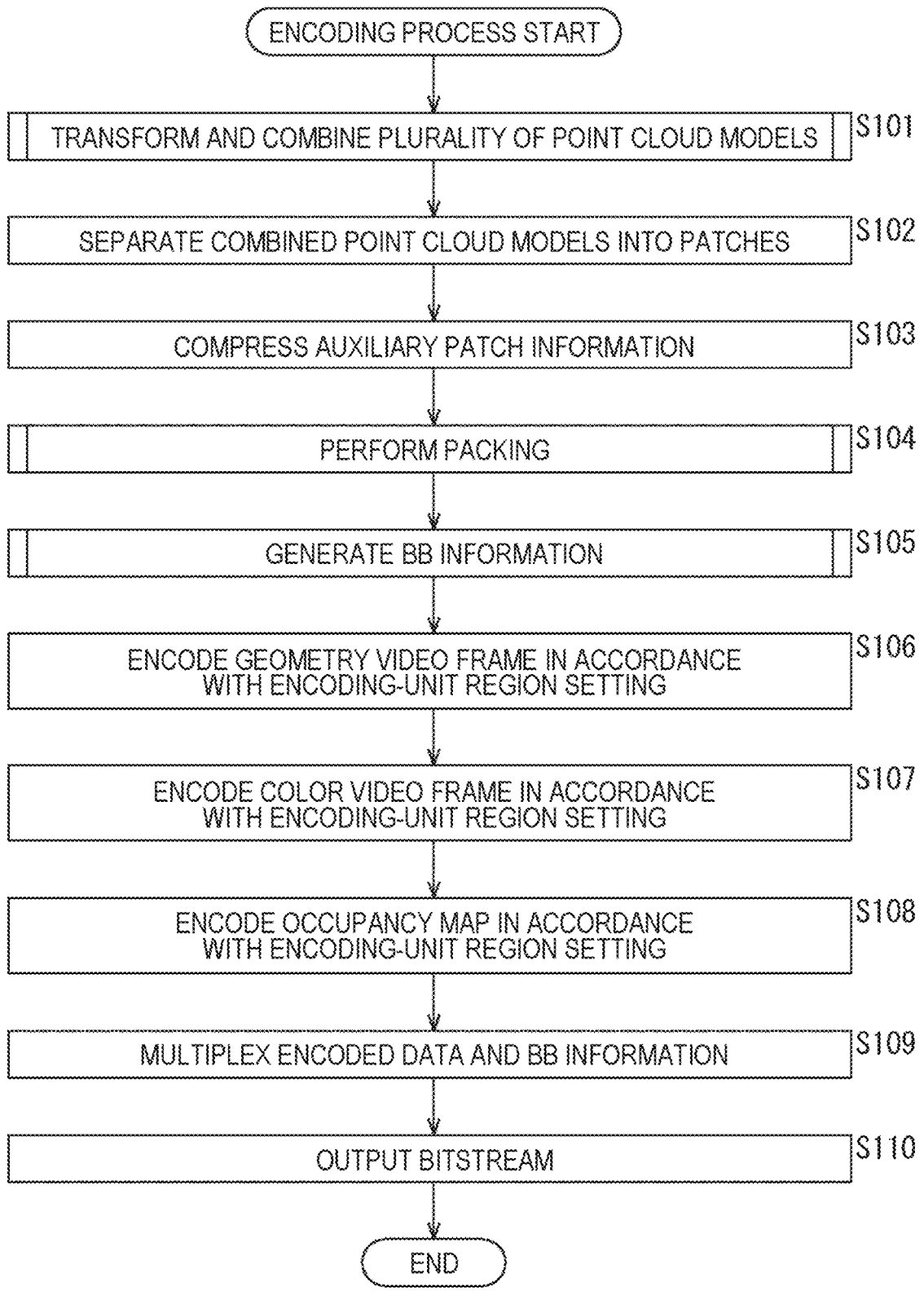
FIG. 5 is a flowchart for explaining an example flow in an encoding process.

Next, an example flow in an encoding process to be performed by the encoding device 100 is described, with reference to the flowchart shown in FIG. 5.

When the encoding process is started, the model transform unit 111 of the encoding device 100 performs a transform process in step S101, to transform and combine a plurality of point cloud models included in a point cloud into one group. The model transform unit 111 also generates the transform information regarding the transform.

In step S102, the patch separation unit 112 projects (the group of) the plurality of point cloud models combined in step S101 onto a two-dimensional plane, and separates the point cloud models into patches. In doing so, the patch separation unit 112 may set a projection plane for each point cloud model by the method described above in <Point Cloud Model Projection Plane Setting> and the like, for example. In this manner, the patch separation unit 112 can project each point cloud model onto more appropriate projection planes. Thus, the decrease in coding efficiency due to inefficiency in the projection of the point cloud models can be prevented (the coding efficiency can be increased).

The patch separation unit 112 may also generate projection plane information regarding the setting of the projection plane by the method described above in <Signal of Projection Plane Information> and the like, for example, and transmit the projection plane information to the decoding side. As a result, the decoding side can perform correct decoding (correctly reconstruct the point cloud).

The patch separation unit 112 also generates the auxiliary patch information regarding the separation.

In step S103, the auxiliary patch information compression unit 114 compresses (encodes) the auxiliary patch information generated in step S102.

In step S104, the packing unit 113 performs a packing process, to arrange the respective patches of the positional information and the attribute information generated in step S102 in two-dimensional images, and pack the patches as video frames. The packing unit 113 also generates the model information and the occupancy map. The packing unit 113 further performs a dilation process on the color video frame. The packing unit 113 also generates the control information regarding such packing.

In step S105, the BB information generation unit 119 performs a BB information generation process, to generate the BB information containing the transform information generated in step S101, the model information generated in step S104, and the like.

In step S106, the video encoding unit 115 encodes the geometry video frame generated in step S104, by an encoding method for two-dimensional images. In doing so, the video encoding unit 115 encodes the geometry video frame, in accordance with the setting of the unit of encoding that has the respective point cloud model patches arranged therein in step S104 and can be independently decoded (encoding-unit region setting). That is, when slices or tiles are set, for example, the geometry video frame is encoded independently slice by slice or tile by tile.

In step S107, the video encoding unit 116 encodes the color video frame generated in step S104, by an encoding method for two-dimensional images. In doing so, the video encoding unit 116 encodes the color video frame, in accordance with the setting of the unit of encoding that has the respective point cloud model patches arranged therein in step S104 and can be independently decoded (encoding-unit region setting). That is, when slices or tiles are set, for example, the color video frame is encoded independently slice by slice or tile by tile.

In step S108, the OMap encoding unit 117 encodes the occupancy map generated in step S104, by a predetermined encoding method.

In step S109, the multiplexer 118 multiplexes the various kinds of information generated as described above (for example, the encoded data of the auxiliary patch information generated in step S103, the control information regarding the packing generated in step S104, the BB information generated in step S105, the encoded data of the geometry video frame generated in step S106, the encoded data of the color video frame generated in step S107, the encoded data of the occupancy map generated in step S108, and the like), to generate a bitstream containing these pieces of information.

In step S110, the multiplexer 118 outputs the bitstream generated in step S109, to the outside of the encoding device 100.

When the process in step S110 is completed, the encoding process comes to an end.

<Flow in the Transform Process>

Next, an example flow in the transform process to be performed in step S101 in FIG. 5 is described, with reference to the flowchart shown in FIG. 6.

When the transform process is started, the model transform unit 111 performs a bounding box setting process in step S131, to set a bounding box for each point cloud model.

In step S132, the model transform unit ill transforms a parameter of each bounding box (each point cloud model) set in step S131. For example, the model transform unit 111 transforms a parameter such as shift, rotation, time stamp, scale, or frame rate as described above in <Transform of Point Cloud Models> and the like. By doing so, the model transform unit 111 can prevent an increase in the number of bitstreams while preventing a decrease in coding efficiency, even when a plurality of point cloud models exists in the point cloud. Thus, the model transform unit 111 can prevent an increase in the number of instances necessary for decoding. That is, an increase in the load of the decoding process can be prevented. Thus, an increase in the cost of the decoder can be prevented. Further, an increase in the processing time of the decoding process can be prevented.

In step S133, the model transform unit 111 generates transform information about the parameter of each bounding box as described above in <Signal of Transform Information> and the like. For example, the model transform unit 111 generates transform information indicating the ratio, the difference, or the like between before and after the transform. By doing so, the model transform unit 111 can enable the decoding side to perform correct inverse transform.

When the process in step S133 is completed, the transform process comes to an end.

<Flow in the Bounding Box Setting Process>

Next, an example flow in the bounding box setting process to be performed in step S131 in FIG. 6 is described, with reference to the flowchart shown in FIG. 7.

When the bounding box setting process is started, the model transform unit 111 derives the normal vector of the portion of each point cloud model included in the point cloud in step S141.

In step S142, the model transform unit 111 sets bounding boxes so that the one having a large distribution in the normal direction derived in step S141 matches the orthogonal projection vector. When the process in step S142 is completed, the bounding box setting process comes to an end, and the process returns to FIG. 6.

<Flow in the Packing Process>

Figure 8:
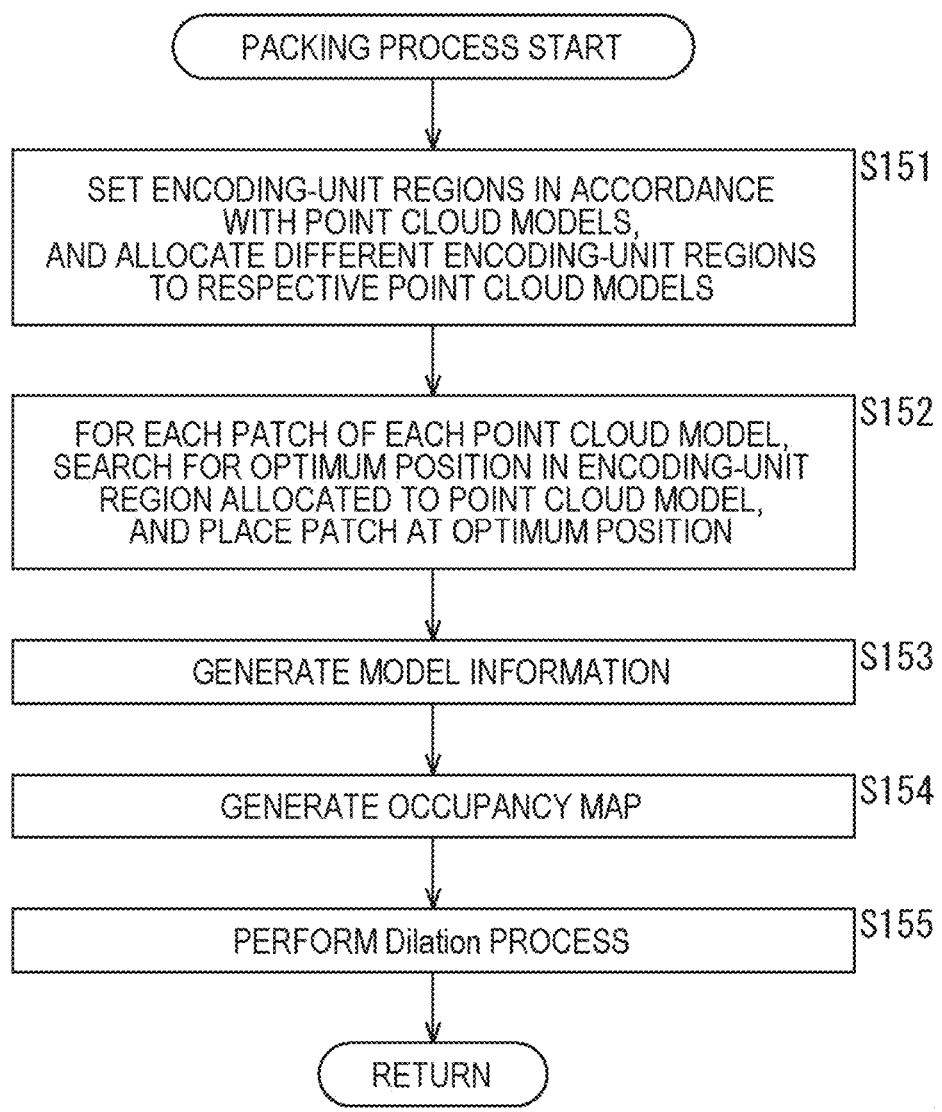
FIG. 8 is a flowchart for explaining an example flow in a packing process.

Next, an example flow in the packing process to be performed in step S104 in FIG. 5 is described, with reference to the flowchart shown in FIG. 8.

When the packing process is started, the packing unit 113 sets encoding-unit regions in accordance with the point cloud models in step S151, to allocate different encoding-unit regions to the respective point cloud models.

In step S152, for each patch of each point cloud model, the packing unit 113 searches for an optimum position in the encoding-unit region allocated to the point cloud model in step S151, and places the patch at the optimum position.

That is, the packing unit 113 places the patches belonging to the same point cloud model in the same independently decodable unit of encoding, by the method described above in <Patch Arrangement Control for Each Point Cloud Model> and the like. By doing so, the packing unit 113 generates a geometry video frame and a color video frame. As a result, the decoding side can perform so-called "partial decoding" for reconstruction by only partially decoding the point cloud models.

In step S153, the packing unit 113 generates the model information about the point cloud model placement in step S152, by the method described above in <Signal of Model Information>. As a result, the decoding side can perform so-called "partial decoding" for reconstruction by only partially decoding the point cloud models.

In step S154, the packing unit 113 generates the occupancy map.

In step S155, the packing unit 113 performs a dilation process on the color video frame.

When the process in step S155 is completed, the packing process comes to an end, and the process returns to FIG. 5.

<Flow in the BB Information Generation Process>

Figure 9:
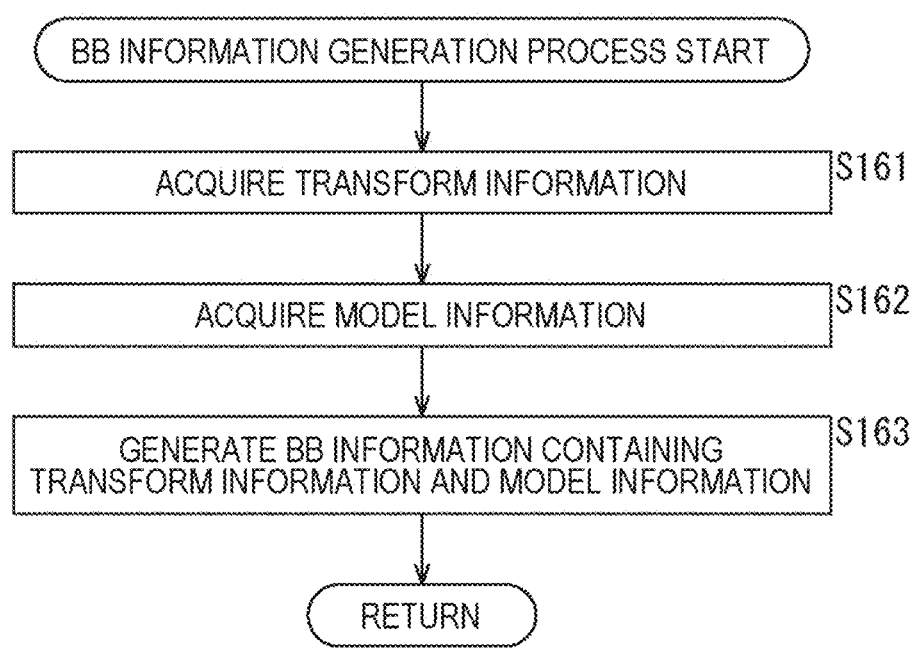
FIG. 9 is a flowchart for explaining an example flow in a BB information generation process.

Next, an example flow in the BB information generation process to be performed in step S105 in FIG. 5 is described, with reference to the flowchart shown in FIG. 9.

When the BB information generation process is started, the BB information generation unit 119 in step S161 acquires the transform information generated in step S133 in FIG. 6.

In step S162, the BB information generation unit 119 acquires the model information generated in step S153 in FIG. 8.

In step S163, the BB information generation unit 119 generates the BB information containing the transform information and the model information. This BB information is multiplexed with the encoded data and the like by the multiplexer 118 in step S109 (FIG. 5).

When the process in step S163 is completed, the BB information generation process comes to an end, and the process returns to FIG. 5.

As the respective processes are performed in the above manner, an increase in the number of bitstreams can be prevented, and an increase in the load of the decoding process can be prevented.

4. Second Embodiment

<Decoding Device>

Figure 10:
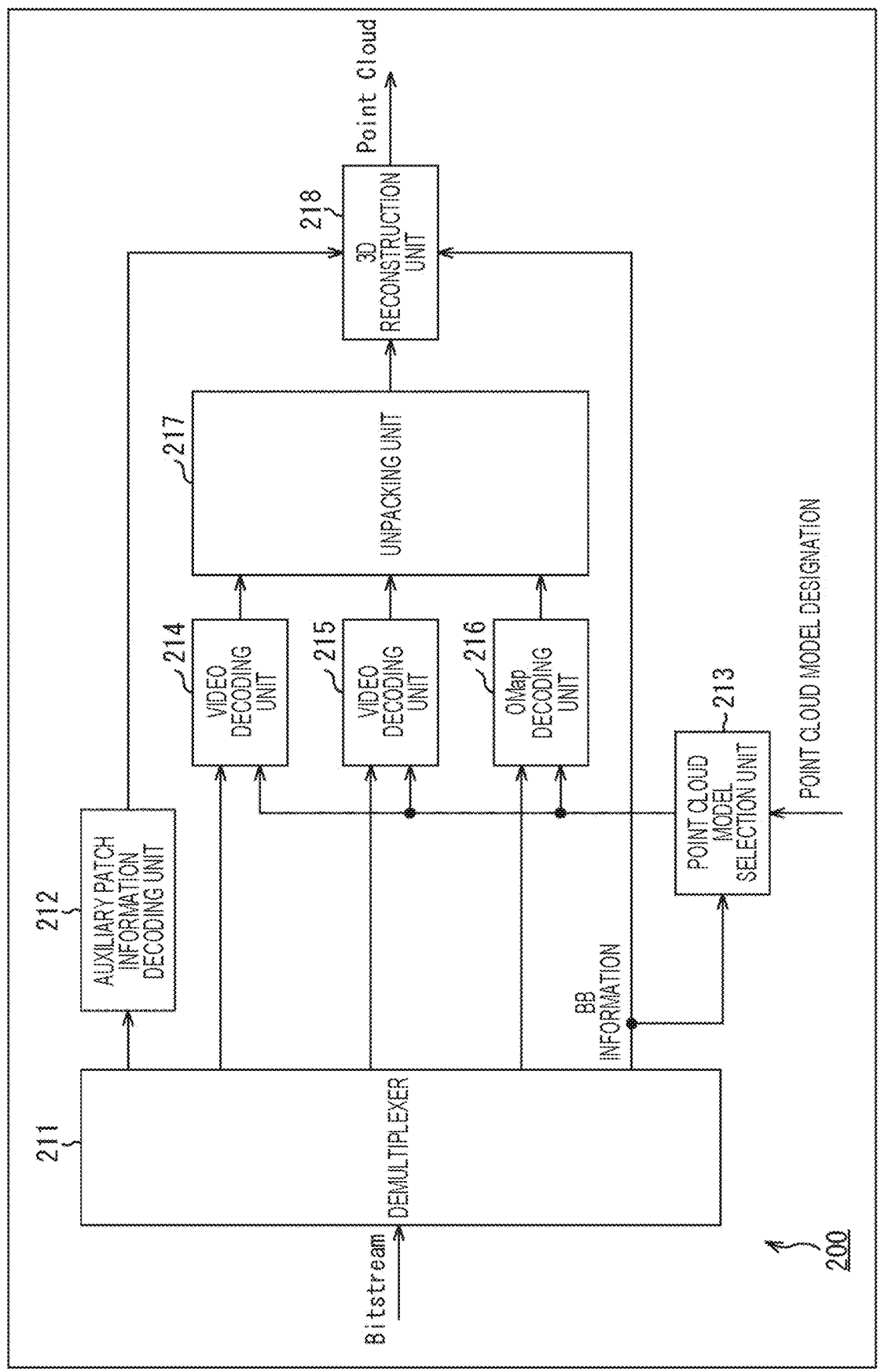
FIG. 10 is a block diagram showing a typical example configuration of a decoding device.

FIG. 10 is a block diagram showing an example configuration of a decoding device as an embodiment of an image processing apparatus to which the present technology is applied. A decoding device 200 shown in FIG. 10 is a device (a decoding device to which the video-based approach is applied) that decodes, by a decoding method for two-dimensional images, encoded data generated through projection of 3D data such as a point cloud onto a two-dimensional plane, and projects the resultant data into a three-dimensional space. For example, the decoding device 200 decodes a bitstream the encoding device 100 (FIG. 4) has generated by encoding a point cloud, and reconstructs the point cloud.

Note that FIG. 10 shows the principal components and aspects such as processing units and the data flow, but does not necessarily show every aspect. That is, in the decoding device 200, there may be a processing unit that is not shown as a block in FIG. 10, or there may be a processing or data flow that is not indicated by arrows or the like in FIG. 10. This also applies to the other drawings for explaining the processing units and the like in the decoding device 200.

As shown in FIG. 10, the decoding device 200 includes a demultiplexer 211, an auxiliary patch information decoding unit 212, a point cloud model selection unit 213, a video decoding unit 214, a video decoding unit 215, an OMap decoding unit 216, an unpacking unit 217, and a 3D reconstruction unit 218.

The demultiplexer 211 performs a process related to data demultiplexing. For example, the demultiplexer 211 acquires a bitstream input to the decoding device 200. This bitstream is supplied from the encoding device 100, for example. The demultiplexer 211 demultiplexes this bitstream, extracts the encoded data of the auxiliary patch information, and supplies the extracted encoded data to the auxiliary patch information decoding unit 212. The demultiplexer 211 also extracts the encoded data of the geometry video frame from the bitstream through the demultiplexing, and supplies the extracted encoded data to the video decoding unit 214. The demultiplexer 211 further extracts the encoded data of the color video frame from the bitstream through the demultiplexing, and supplies the extracted encoded data to the video decoding unit 215. The demultiplexer 211 also extracts the encoded data of the occupancy map from the bitstream through the demultiplexing, and supplies the extracted encoded data to the OMap decoding unit 216. The demultiplexer 211 further extracts the control information regarding the packing from the bitstream through the demultiplexing, and supplies the extracted control information to the unpacking unit 217. The demultiplexer 211 also extracts the BB information from the bitstream through the demultiplexing, and supplies the extracted BB information to the point cloud model selection unit 213 and the 3D reconstruction unit 218.

The auxiliary patch information decoding unit 212 performs a process related to decoding of the encoded data of the auxiliary patch information. For example, the auxiliary patch information decoding unit 212 acquires the encoded data of the auxiliary patch information supplied from the demultiplexer 211. The auxiliary patch information decoding unit 212 also decodes (expands) the encoded data of the auxiliary patch information included in the acquired data. The auxiliary patch information decoding unit 212 supplies the auxiliary patch information obtained through the decoding to the 3D reconstruction unit 218.

The point cloud model selection unit 213 performs a process related to selection of a point cloud model to be partially decoded. For example, the point cloud model selection unit 213 acquires the BB information from the demultiplexer 211. The point cloud model selection unit 213 also receives a point cloud model designation input by the user or the like, on the basis of the model information contained in the BB information. For example, the point cloud model selection unit 213 presents the point cloud models contained in the model information as options to the user or the like, and causes the user or the like to select the point cloud model to be decoded. The point cloud model selection unit 213 supplies the video decoding unit 214, the video decoding unit 215, and the OMap decoding unit 216 with information designating the region (an independently decodable unit of encoding) corresponding to the selected point cloud model (the patches of the selected point cloud model are placed in the region).

The video decoding unit 214 performs a process related to decoding of the encoded data of the geometry video frame. For example, the video decoding unit 214 acquires the encoded data of the geometry video frame supplied from the demultiplexer 211. The video decoding unit 214 decodes the encoded data of the geometry video frame by an appropriate decoding method for two-dimensional images, such as AVC or HEVC, for example.

Note that the video decoding unit 214 can partially decode the region (the independently decodable unit of encoding) designated by the point cloud model selection unit 213. For example, when the region to be decoded is designated by the point cloud model selection unit 213, the video decoding unit 214 decodes the designated region in the encoded data of the geometry video frame by an appropriate decoding method for two-dimensional images, such as AVC or HEVC, for example. For example, the video decoding unit 214 decodes the frame, slice, tile, or the like designated by the point cloud model selection unit 213 in the encoded data of the geometry video frame.

In the above manner, the video decoding unit 214 can partially decode the geometry video frame. The video decoding unit 214 supplies the geometry video frame (or a region therein) obtained through the decoding, to the unpacking unit 217.

The video decoding unit 215 performs a process related to decoding of the encoded data of the color video frame. For example, the video decoding unit 215 acquires the encoded data of the color video frame supplied from the demultiplexer 211. The video decoding unit 215 decodes the encoded data of the color video frame by an appropriate decoding method for two-dimensional images, such as AVC or HEVC, for example.

Note that the video decoding unit 215 can partially decode the region (the independently decodable unit of encoding) designated by the point cloud model selection unit 213. For example, when the region to be decoded is designated by the point cloud model selection unit 213, the video decoding unit 215 decodes the designated region in the encoded data of the color video frame by an appropriate decoding method for two-dimensional images, such as AVC or HEVC, for example. For example, the video decoding unit 215 decodes the frame, slice, tile, or the like designated by the point cloud model selection unit 213 in the encoded data of the color video frame.

In the above manner, the video decoding unit 215 can partially decode the color video frame. The video decoding unit 215 supplies the color video frame (or a region therein) obtained through the decoding, to the unpacking unit 217.

The OMap decoding unit 216 performs a process related to decoding of the encoded data of the occupancy map. For example, the OMap decoding unit 216 acquires the encoded data of the occupancy map supplied from the demultiplexer 211. The OMap decoding unit 216 decodes the encoded data of the occupancy map by an appropriate decoding method compatible with the encoding method.

Note that the OMap decoding unit 216 can partially decode the region (an independently decodable unit of encoding) designated by the point cloud model selection unit 213. For example, when the region to be decoded is designated by the point cloud model selection unit 213, the OMap decoding unit 216 decodes the designated region in the encoded data of the occupancy map by an appropriate decoding method compatible with the encoding method. For example, the OMap decoding unit 216 decodes the frame, slice, tile, or the like designated by the point cloud model selection unit 213 in the encoded data of the occupancy map.

In the above manner, the OMap decoding unit 216 can partially decode the occupancy map. The OMap decoding unit 216 supplies the occupancy map (or a region therein) obtained through the decoding, to the unpacking unit 217.

The unpacking unit 217 performs a process related to unpacking. For example, the unpacking unit 217 acquires the geometry video frame from the video decoding unit 214, the color video frame from the video decoding unit 215, and the occupancy map from the OMap decoding unit 216. The unpacking unit 217 also unpacks the geometry video frame and the color video frame, on the basis of the control information regarding the packing. The unpacking unit 217 supplies the 3D reconstruction unit 218 with the data (geometry patches or the like) of the positional information (Geometry), the data (texture patches or the like) of the attribute information (Texture), the occupancy map, and the like, which have been obtained by the unpacking unit 217 performing the unpacking.

The 3D reconstruction unit 218 performs a process related to reconstruction of the point cloud. For example, the 3D reconstruction unit 218 reconstructs the point cloud, on the basis of the BB information supplied from the demultiplexer 211, the auxiliary patch information supplied from the auxiliary patch information decoding unit 212, and the data (geometry patches or the like) of the positional information (Geometry), the data (texture patches or the like) of the attribute information (Texture), the occupancy map, and the like supplied from the unpacking unit 217.

For example, on the basis of the projection plane information, the 3D reconstruction unit 218 identifies the projection planes corresponding to the respective point cloud models in the group, and reconstructs the point cloud from the patches and the like by using the projection planes. Accordingly, the decoding device 200 can project each point cloud model onto more appropriate projection planes. Thus, a decrease in coding efficiency due to inefficiency in the projection of the point cloud models can be prevented (coding efficiency can be increased).

The 3D reconstruction unit 218 can also inversely transform the reconstructed point cloud models, using the transform information contained in the BB information, for example. Thus, the 3D reconstruction unit 218 can perform inverse transform so as to correctly cope with the transform process performed on the encoding side.

The 3D reconstruction unit 218 outputs the reconstructed point cloud to the outside of the decoding device 200. This point cloud is supplied to a display unit and is turned into an image, for example. The image is then displayed, is recorded on a recording medium, or is supplied to another device via communication.

With such a configuration, the decoding device 200 can correctly decode a plurality of point cloud models grouped into one bitstream. Accordingly, even when a plurality of point cloud models exists in a point cloud, the decoding device 200 can prevent an increase in the number of bitstreams while preventing a decrease in coding efficiency. Thus, the decoding device 200 can prevent an increase in the number of instances necessary for itself. That is, an increase in the load of the decoding process can be prevented. Thus, an increase in the cost of the decoder can be prevented. Further, an increase in the processing time of the decoding process can be prevented.

<Flow in a Decoding Process>

Figure 11:
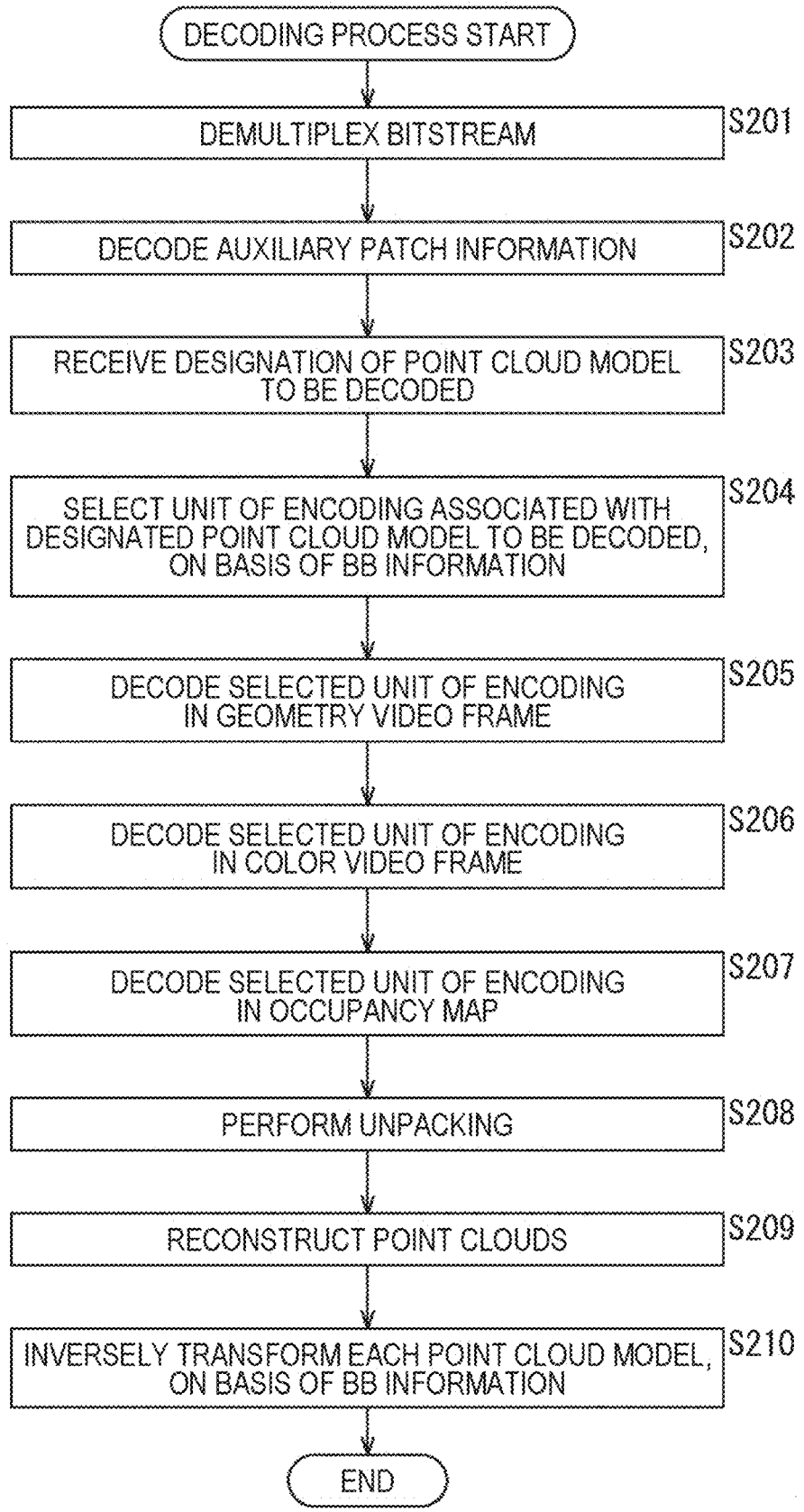
FIG. 11 is a flowchart for explaining an example flow in a decoding process.

Next, an example flow in a decoding process to be performed by the decoding device 200 is described, with reference to the flowchart shown in FIG. 11.

When the decoding process is started, the demultiplexer 211 of the decoding device 200 demultiplexes a bitstream in step S201.

In step S202, the auxiliary patch information decoding unit 212 decodes the auxiliary patch information extracted from the bitstream in step S201.

In step S203, the point cloud model selection unit 213 receives a designation of the point cloud model to be decoded.

In step S204, on the basis of the BB information, the point cloud model selection unit 213 selects the unit of encoding that corresponds to the received designation of the point cloud model and is independently decodable (which is the unit of encoding that has the patches of the designated point cloud model placed therein and is independently decodable).

Note that, when partial decoding is not performed, or where the entire video frame is decoded, the processes in steps S203 and S204 may be skipped.

In step S205, the video decoding unit 214 decodes the encoded data of the geometry video frame (the video frame of the positional information) extracted from the bitstream in step S201.

Note that, when partial decoding is performed, or where a designation of the point cloud model to be decoded is received in step S203, and the unit of encoding to be decoded is selected in step S204, the video decoding unit 214 decodes the unit of encoding (such as a frame, a slice, or a tile, for example) selected in step S204 in the geometry video frame.

In step S206, the video decoding unit 215 decodes the encoded data of the color video frame (the video frame of the attribute information) extracted from the bitstream in step S201.

Note that, when partial decoding is performed, the video decoding unit 215 decodes the unit of encoding (such as a frame, a slice, or a tile, for example) selected in step S204 in the color video frame.

In step S207, the OMap decoding unit 216 decodes the encoded data of the occupancy map extracted from the bitstream in step S201.

Note that, when partial decoding is performed, the OMap decoding unit 216 decodes the unit of encoding (such as a frame, a slice, or a tile, for example) selected in step S204 in the occupancy map.

In step S208, the unpacking unit 217 performs unpacking. For example, the unpacking unit 217 unpacks the geometry video frame obtained from the encoded data decoded in step S205, to generate geometry patches. The unpacking unit 217 also unpacks the color video frame obtained from the encoded data decoded in step S206, to generate texture patches. The unpacking unit 217 further unpacks the occupancy map obtained from the encoded data decoded in step S207, to extract the occupancy map associated with the geometry patches and the texture patches.

In step S209, the 3D reconstruction unit 218 reconstructs the point cloud (each point cloud model), on the basis of the auxiliary patch information obtained in step S202, and the geometry patches, the texture patches, the occupancy map, and the like obtained in step S208.

In step S210, on the basis of the transform information contained in the BB information, the 3D reconstruction unit 218 performs an inverse transform process on each reconstructed point cloud model, the inverse transform process being the inverse process of the transform process performed by the encoding side.

When the process in step S210 is completed, the decoding process comes to an end.

By performing the respective processes in the above manner, the decoding device 200 can prevent an increase in the number of bitstreams, and an increase in the load of the decoding process.

5. Local Projection Plane Control

When a point cloud model has a portion in which points are sparse, the projection plane set for the entire point cloud model is not necessarily the projecting direction optimum for a point-dense portion included in the point cloud model (such a point-dense portion is also called a partial point cloud model). That is, there is a possibility that a partial point cloud model is projected in an inefficient direction, leading to a decrease in coding efficiency.

<Local Control on Projection Planes>

Therefore, as shown in the first row from the top in a table in FIG. 12, the projection plane of a point cloud model may be locally controlled. For example, as shown in the second row from the top in the table in FIG. 12, a point cloud model including a portion in which points are sparse may be divided into a plurality of partial point cloud models, and a projection plane may be set for each of the partial point cloud models.

Any appropriate method may be adopted for dividing the projection model. For example, as shown in the table in FIG. 12, point-dense clouds included in the point cloud model may be separated from one another to form partial point cloud models.

Figure 13:
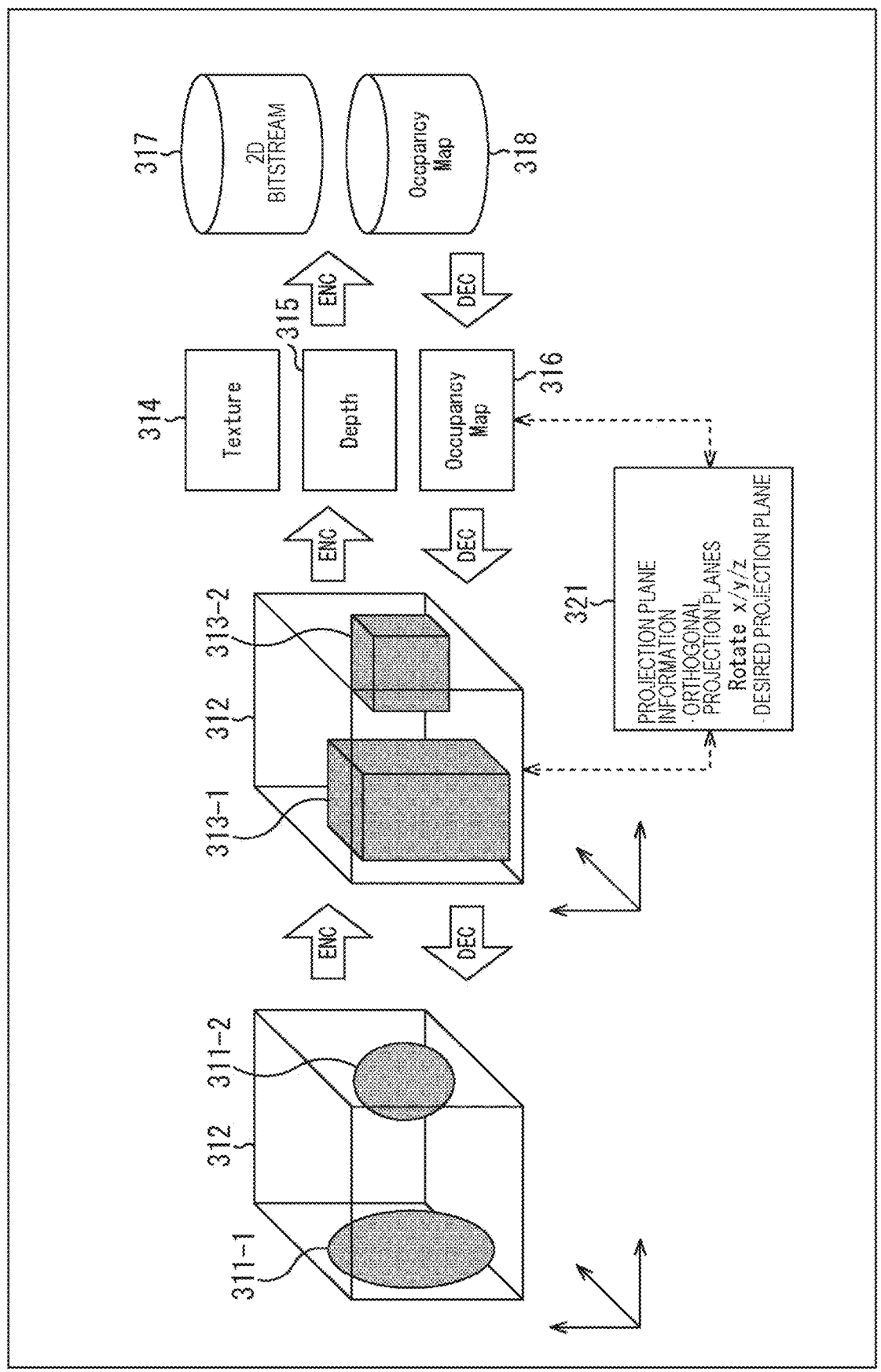
FIG. 13 is a diagram for explaining the outline of point cloud encoding and decoding to which the present technology is applied.

For example, as shown at the leftmost side in FIG. 13, the point cloud model corresponding to a bounding box 312 includes a portion in which points are sparse, and also includes a partial point cloud model 311-1 and a partial point cloud model 311-2 in which points are dense. In such a case, the partial point cloud model 311-1 and the partial point cloud model 311-2 are divided, and projection planes are set independently for each partial point cloud model. For example, as shown at the second column from the left in FIG. 13, projection planes 313-1 in six directions orthogonal to the partial point cloud model 311-1 are set, and projection planes 313-2 in six directions orthogonal to the partial point cloud model 311-2 are set. Projection is then performed on the projection planes, and patches are generated and are placed in two-dimensional images. In this manner, a color video frame (Texture) 314, a geometry video frame (Depth) 315, and an occupancy map (Occupancy Map) 315 are generated as shown in the third column from the left in FIG. 13. Those are then encoded, and a 2D bitstream 317 and an occupancy map 318 are generated. At the time of decoding, the inverse processes of them are performed.

As projection planes can be set for each partial point cloud model in this manner, each partial point cloud model can be projected onto more appropriate projection planes. Accordingly, a decrease in coding efficiency due to inefficiency in projection of point cloud models can be prevented (coding efficiency can be increased).

For example, as shown in the table in FIG. 12, the projection planes in the six orthogonal directions of each partial point cloud model may be made rotatable. In this manner, the projection planes can be relatively easily made more suitable for the partial point cloud models (or can be turned into planes on which effective projection can be performed).

Further, as shown in the table in FIG. 12, for example, any projection plane may be set (added). With this arrangement, the degree of freedom of the projection planes of the respective partial point cloud models can be increased, and more efficient projection can be expected (or a further increase in coding efficiency can be expected).

<Signal of Projection Plane Information>

Note that, when a projection plane is set for each partial point cloud model in this manner (when a projection plane for an entire point cloud model is not set), information about the projection planes is also necessary at the time of decoding (when the point cloud is reconstructed). Therefore, as shown in the second row from the top in the table in FIG. 12, projection plane information that is the information regarding the projection planes set as described above is generated, and is then transmitted to the decoding side (signaling of projection plane information).

For example, when projection planes (the projection planes 313-1 and the projection planes 313-2) are set for the respective partial point cloud models as shown in the second column from the left in FIG. 13, projection plane information 321 is generated for those projection planes.

This projection plane information may contain any information that is necessary for identifying the projection planes, as shown in the table in FIG. 12, for example. In the case illustrated in FIG. 13, for example, the projection plane information 321 contains information (Rotate x/y/z) indicating the amounts of rotation of projection planes and the like. Other than that, the projection plane information 321 may of course contain information (Shift x/y/z) indicating the amounts of shift of projection planes in the six orthogonal directions, information indicating the amounts of change in scale (Scale x/y/z), and the like, for example. The projection plane information 321 may further contain information indicating a projection plane that is added as desired, for example.

Further, as shown in the table in FIG. 12, for example, this projection plane information may be stored in the occupancy map. For example, in the case illustrated in FIG. 13, the projection plane information 321 is stored in the occupancy map 316 (which is the occupancy map 318). At the time of encoding, this projection plane information 321 is generated and is stored into the occupancy map 16. At the time of decoding, the projection plane information 321 is read from the occupancy map 316, and is used for reconstructing the point cloud.

6. Third Embodiment

<Encoding Device>

Figure 14:
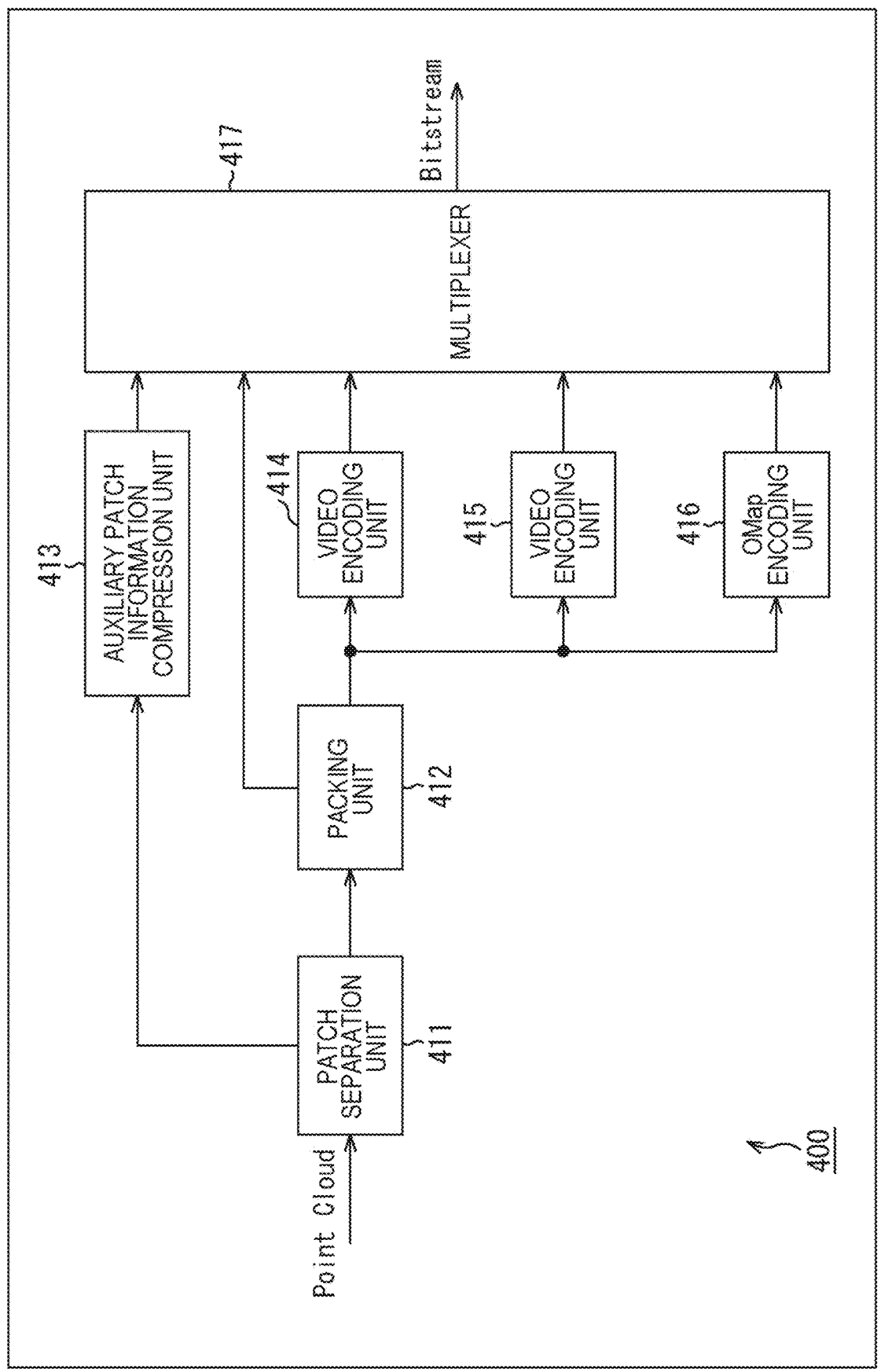
FIG. 14 is a block diagram showing a typical example configuration of an encoding device.

Next, a configuration for realizing the above techniques is described. FIG. 14 is a block diagram showing an example configuration of an encoding device as an embodiment of an image processing apparatus to which the present technology is applied. An encoding device 400 shown in FIG. 14 is a device similar to the encoding device 100 (FIG. 4), and is a device that projects 3D data such as a point cloud onto a two-dimensional plane and performs encoding by an encoding method for two-dimensional images (an encoding device to which the video-based approach is applied).

Note that FIG. 14 shows the principal components and aspects such as processing units and the data flow, but does not necessarily show every aspect. That is, in the encoding device 400, there may be a processing unit that is not shown as a block in FIG. 14, or there may be a processing or data flow that is not indicated by arrows or the like in FIG. 14. This also applies to the other drawings for explaining the processing units and the like in the encoding device 400.

As shown in FIG. 14, the encoding device 400 includes a patch separation unit 411, a packing unit 412, an auxiliary patch information compression unit 413, a video encoding unit 414, a video encoding unit 415, an OMap encoding unit 416, and a multiplexer 417.

The patch separation unit 411 performs a process related to separation of 3D data. For example, the patch separation unit 411 acquires a point cloud that is input to the encoding device 400. The patch separation unit 411 also separates the acquired point cloud into a plurality of segmentations, projects the point cloud onto a two-dimensional plane for each segmentation, and generates patches of positional information and patches of attribute information. The patch separation unit 411 supplies information regarding each of the generated patches to the packing unit 412. The patch separation unit 411 also supplies auxiliary patch information, which is information regarding the separation, to the auxiliary patch information compression unit 413.

The packing unit 412 performs a process related to data packing. For example, the packing unit 412 acquires, from the patch separation unit 411, information regarding the patches of positional information (Geometry) indicating the positions of points, and information regarding the patches of attribute information (Texture) such as color information to be added to the positional information.

The packing unit 412 also places each of the acquired patches in a two-dimensional image, to pack the patches as a video frame. For example, the packing unit 412 arranges the patches of positional information in a two-dimensional image, to pack the patches as a geometry video frame. The packing unit 412 also arranges the patches of attribute information in a two-dimensional image, to pack the patches as a color video frame, for example. The packing unit 412 also generates an occupancy map associated with these video frames. The packing unit 412 further performs a dilation process on the color video frame.

The packing unit 412 supplies the geometry video frame generated in this manner to the video encoding unit 414. The packing unit 412 also supplies the color video frame generated in this manner to the video encoding unit 415. The packing unit 412 further supplies the occupancy map generated in this manner to the OMap encoding unit 416. The packing unit 412 also supplies control information regarding such packing to the multiplexer 417.

The auxiliary patch information compression unit 413 performs a process related to compression of the auxiliary patch information. For example, the auxiliary patch information compression unit 413 acquires data supplied from the patch separation unit 411. The auxiliary patch information compression unit 413 encodes (compresses) the auxiliary patch information included in the acquired data. The auxiliary patch information compression unit 413 supplies the resultant encoded data of the auxiliary patch information to the multiplexer 417.

The video encoding unit 414 performs a process related to encoding of the video frame of positional information (Geometry). For example, the video encoding unit 414 acquires the geometry video frame supplied from the packing unit 412. The video encoding unit 414 also encodes the acquired geometry video frame by an appropriate encoding method for two-dimensional images, such as AVC or HEVC, for example. The video encoding unit 414 supplies the encoded data obtained by the encoding (encoded data of the geometry video frame), to the multiplexer 417.

The video encoding unit 415 performs a process related to encoding of the video frame of attribute information (Texture). For example, the video encoding unit 415 acquires the color video frame supplied from the packing unit 412. The video encoding unit 415 also encodes the acquired color video frame by an appropriate encoding method for two-dimensional images, such as AVC or HEVC, for example. The video encoding unit 415 supplies the encoded data obtained by the encoding (encoded data of the color video frame), to the multiplexer 417.

The OMap encoding unit 416 performs a process related to encoding of the occupancy map. For example, the OMap encoding unit 416 acquires the occupancy map supplied from the packing unit 412. The OMap encoding unit 416 also encodes the acquired occupancy map by an appropriate encoding method such as arithmetic encoding, for example. The OMap encoding unit 416 supplies the encoded data obtained by the encoding (the encoded data of the occupancy map), to the multiplexer 417.

The multiplexer 417 performs a process related to multiplexing. For example, the multiplexer 417 acquires the encoded data of the auxiliary patch information supplied from the auxiliary patch information compression unit 413. The multiplexer 417 also acquires the control information regarding packing supplied from the packing unit 412. The multiplexer 417 further acquires the encoded data of the geometry video frame supplied from the video encoding unit 414. The multiplexer 417 also acquires the encoded data of the color video frame supplied from the video encoding unit 415. The multiplexer 417 further acquires the encoded data of the occupancy map supplied from the OMap encoding unit 416.

The multiplexer 417 multiplexes those acquired pieces of information, to generate a bitstream (Bitstream). The multiplexer 417 outputs the generated bitstream to the outside of the encoding device 400.

<Patch Separation Unit>

Figure 15:
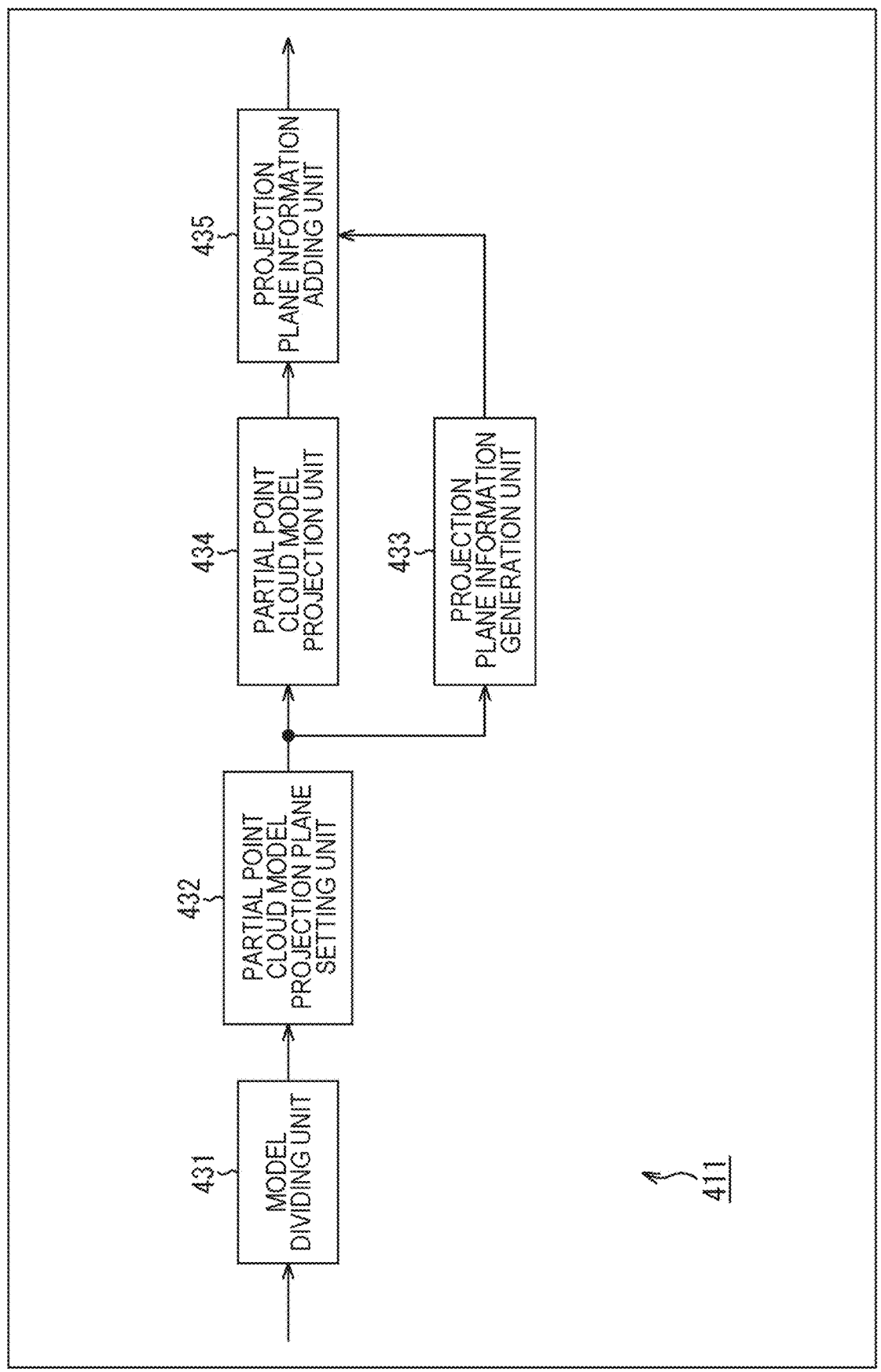
FIG. 15 is a block diagram showing a typical example configuration of a patch separation unit.

FIG. 15 is a block diagram showing a typical example configuration of the patch separation unit 411 shown in FIG. 14. As shown in FIG. 15, the patch separation unit 411 includes a model dividing unit 431, a partial point cloud model projection plane setting unit 432, a projection plane information generation unit 433, a partial point cloud model projection unit 434, and a projection plane information adding unit 435.

The model dividing unit 431 performs a process related to dividing of a point cloud model. For example, the model dividing unit 431 acquires (point cloud models) of a point cloud that is input to the encoding device 400. The model dividing unit 431 also sets a point-dense portion included in the point cloud model as a partial point cloud model, and divides the point cloud model into such partial point cloud models, by the method described above in <Local Control on Projection Planes> in <5. Local Projection Plane Control> and the like, for example. The model dividing unit 431 supplies information regarding each of the set partial point cloud models to the partial point cloud model projection plane setting unit 432.

The partial point cloud model projection plane setting unit 432 performs a process related to projection plane setting for each partial point cloud model. For example, the partial point cloud model projection plane setting unit 432 acquires the information regarding the partial point cloud models supplied from the model dividing unit 431. The partial point cloud model projection plane setting unit 432 also sets projection planes for the respective partial point cloud models by the method described in <Local Control on Projection Planes> in <5. Local Projection Plane Control> and the like, for example. The partial point cloud model projection plane setting unit 432 supplies information regarding the projection planes of the respective partial point cloud models that have been set in this manner, to the projection plane information generation unit 433 and the partial point cloud model projection unit 434.

The projection plane information generation unit 433 performs a process related to generation of projection plane information. For example, the projection plane information generation unit 433 acquires the information regarding the projection planes set for the respective partial point cloud models, which is supplied from the partial point cloud model projection plane setting unit 432. The projection plane information generation unit 433 also generates projection plane information about each projection plane by the method described above in <Signal of Projection Plane Information> in <5. Local Projection Plane Control> and the like, for example. The projection plane information generation unit 433 supplies the generated projection plane information to the projection plane information adding unit 435.

The partial point cloud model projection unit 434 performs a process related to projection of each partial point cloud model. For example, the partial point cloud model projection unit 434 acquires the information regarding the projection planes set for the respective partial point cloud models, which is supplied from the partial point cloud model projection plane setting unit 432. Using the acquired information regarding the projection planes, the partial point cloud model projection unit 434 also projects each partial point cloud model onto the projection plane for each small region, by the method described above in <Local Control on Projection Planes> in <5. Local Projection Plane Control> and the like, for example. By doing so, the partial point cloud model projection unit 434 generates patches. The partial point cloud model projection unit 434 supplies the generated patches to the projection plane information adding unit 435.

The projection plane information adding unit 435 performs a process related to addition of the projection plane information. For example, the projection plane information adding unit 435 acquires the projection plane information supplied from the projection plane information generation unit 433. The projection plane information adding unit 435 also acquires the patches and the like supplied from the partial point cloud model projection unit 434. By the method described above in <Signal of Projection Plane Information> in <5. Local Projection Plane Control> and the like, for example, the projection plane information adding unit 435 adds the projection plane information regarding the projection planes used for generating the patches, to the patches acquired from the partial point cloud model projection unit 434. The projection plane information adding unit 435 also supplies the patches having the projection plane information added thereto, to the packing unit 412. Note that the packing unit 412 stores the projection plane information added to the patches into the occupancy map.

With such a configuration, the encoding device 400 can set projection planes independently of the others for each of the plurality of partial point cloud models of a point cloud, and perform projection. As a result, each partial point cloud model can be projected onto more appropriate projection planes. Accordingly, a decrease in coding efficiency due to inefficiency in projection of point cloud models can be prevented (coding efficiency can be increased).

<Flow in an Encoding Process>

Figure 16:
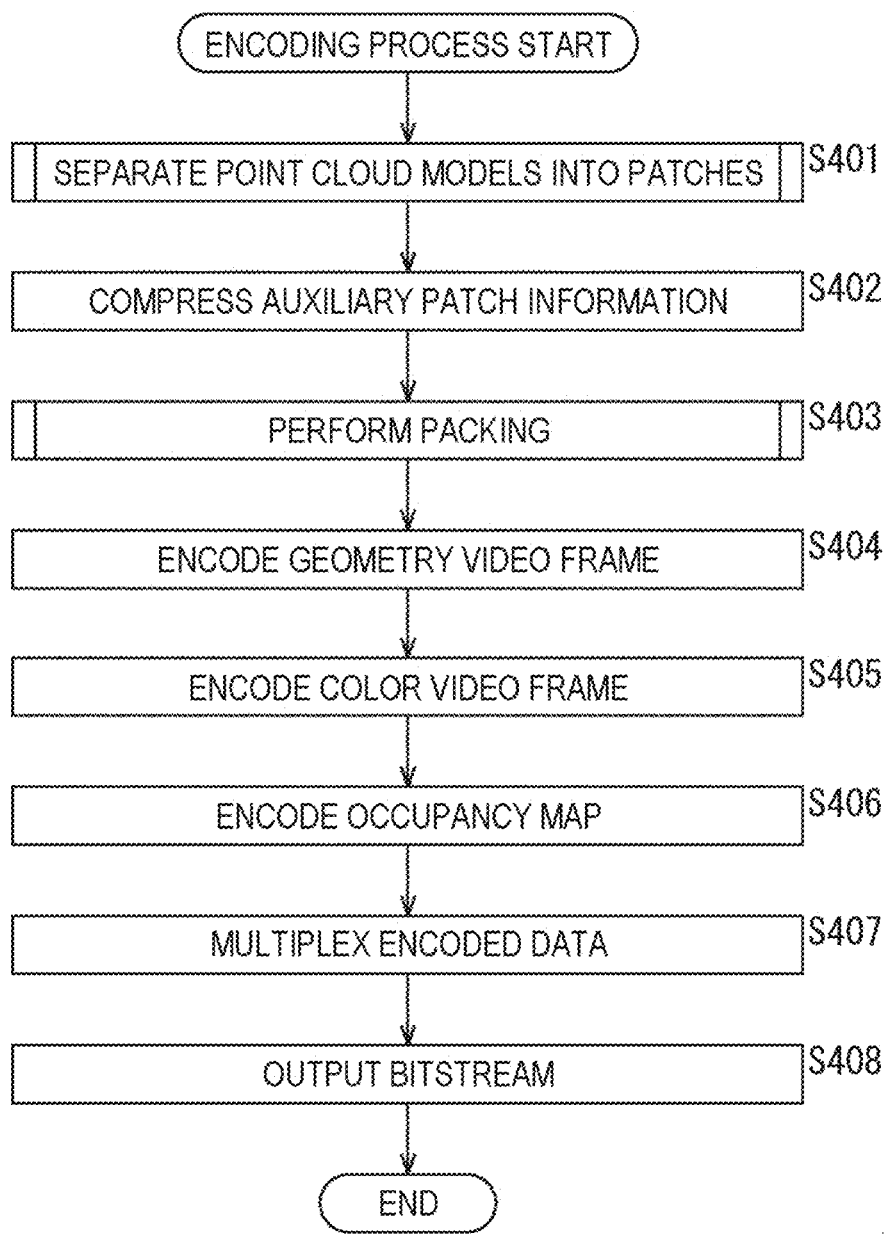
FIG. 16 is a flowchart for explaining an example flow in an encoding process.

Next, an example flow in an encoding process to be performed by the encoding device 400 is described, with reference to the flowchart shown in FIG. 16.

When the encoding process is started, the patch separation unit 411 of the encoding device 400 performs a patch separation process in step S401, to separate a point cloud model into patches. The patch separation unit 112 also generates the auxiliary patch information regarding the separation.

In step S402, the auxiliary patch information compression unit 413 compresses (encodes) the auxiliary patch information generated in step S401.

In step S403, the packing unit 412 performs a packing process, to arrange the respective patches of the positional information and the attribute information generated in step S401 in two-dimensional images, and pack the patches as video frames. The packing unit 412 also generates the model information and the occupancy map. The packing unit 412 further performs a dilation process on the color video frame. The packing unit 412 also generates the control information regarding such packing.

In step S404, the video encoding unit 414 encodes the geometry video frame generated in step S403, by an encoding method for two-dimensional images.

In step S405, the video encoding unit 415 encodes the color video frame generated in step S403, by an encoding method for two-dimensional images.

In step S406, the OMap encoding unit 416 encodes the occupancy map generated in step S403, by a predetermined encoding method.

In step S407, the multiplexer 417 multiplexes the various kinds of information generated as described above (for example, the encoded data of the auxiliary patch information generated in step S402, the control information regarding the packing generated in step S403, the encoded data of the geometry video frame generated in step S404, the encoded data of the color video frame generated in step S405, the encoded data of the occupancy map generated in step S406, and the like), to generate a bitstream containing these pieces of information.

In step S408, the multiplexer 417 outputs the bitstream generated in step S407, to the outside of the encoding device 400.

When the process in step S408 is completed, the encoding process comes to an end.

<Flow of in the Patch Separation Process>

Figure 17:
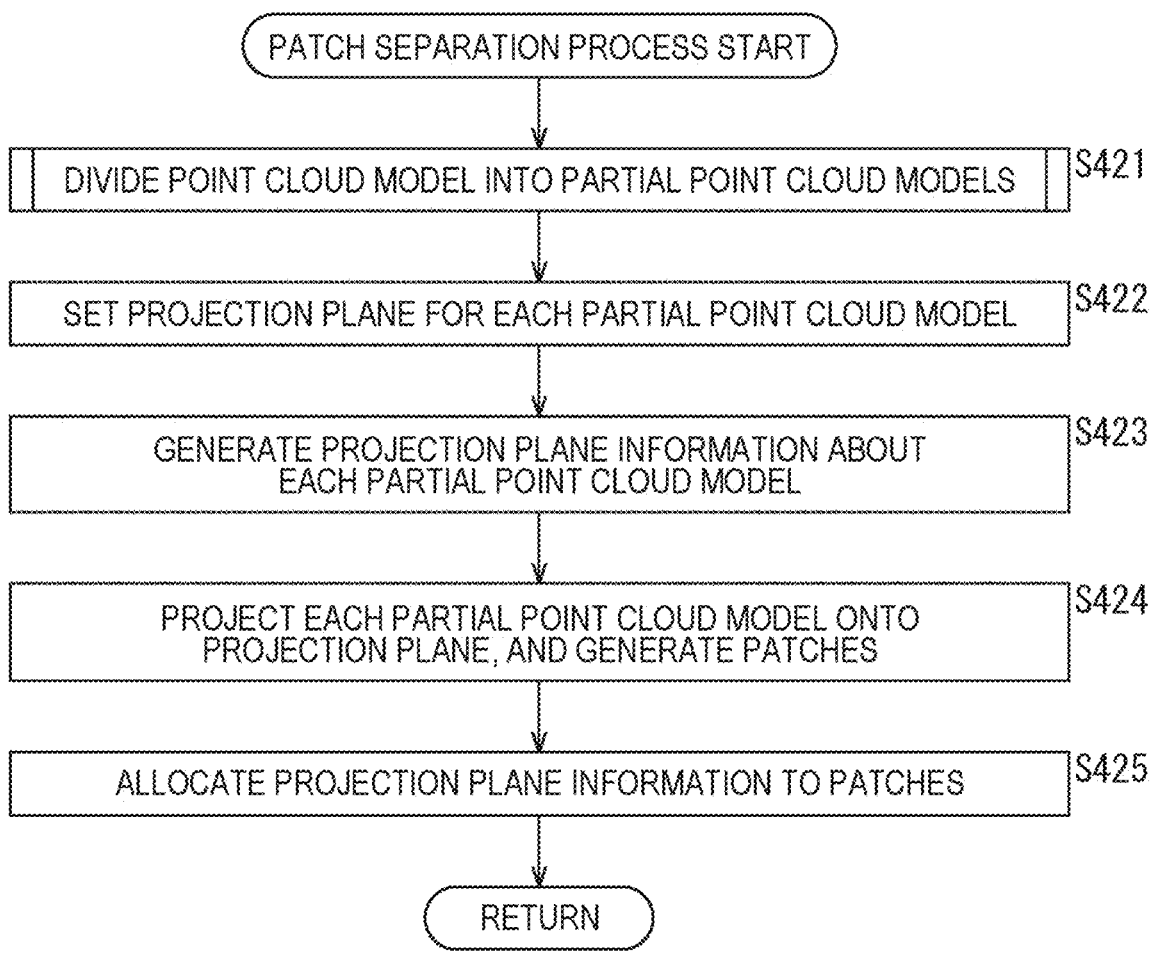
FIG. 17 is a flowchart for explaining an example flow in a patch separation process.

Next, an example flow in the patch separation process to be performed in step S401 in FIG. 16 is described, with reference to the flowchart shown in FIG. 17.

When the patch separation process is started, the model dividing unit 431 in step S421 divides the processing target point cloud model including a point-sparse portion into a plurality of partial point cloud models, by the method described above in <Local Control on Projection Planes> in <5. Local Projection Plane Control> and the like, for example.

In step S422, the partial point cloud model projection plane setting unit 432 sets projection planes of the respective partial point cloud models set in step S421, by the method described above in <Local Control on Projection Planes> in <5. Local Projection Plane Control> and the like, for example.

In step S423, the projection plane information generation unit 433 generates the projection plane information about the projection planes of the respective partial point cloud models set in step S422, by the method described above in <Signal of Projection Plane Information> in <5. Local Projection Plane Control> and the like, for example.

In step S424, the partial point cloud model projection unit 434 projects the respective partial point cloud models onto the projection planes set in step S422, and generates patches, by the method described above in <Local Control on Projection Planes> in <5. Local Projection Plane Control> and the like, for example.

In step S425, the projection plane information adding unit 435 gives (adds) the projection plane information generated in step S423 to the patches generated in step S424, by the method described above in <Signal of Projection Plane Information> in <5. Local Projection Plane Control> and the like, for example. This projection plane information given to the patches is stored into the occupancy map by the packing unit 412.

When the process in step S425 is completed, the patch separation process comes to an end, and the process returns to FIG. 16.

<Flow in the Dividing Process>

Next, an example flow in the dividing process to be performed in step S421 in FIG. 17 is described, with reference to the flowchart shown in FIG. 18.

When the dividing process is started, the model dividing unit 431 identifies point-dense clouds from the histogram of the processing target point cloud models in step S441.

In step S442, the model dividing unit 431 estimates the projecting direction of each of the point-dense clouds identified in step S441, on the basis of the normal vectors of points.

In step S443, the model dividing unit 431 sets point-dense clouds whose projecting directions estimated in step S442 are different from one another, as partial point cloud models.

When the process in step S443 is completed, the dividing process comes to an end, and the process returns to FIG. 17.

<Flow in the Packing Process>

Next, an example flow in the packing process to be performed in step S403 in FIG. 16 is described, with reference to the flowchart shown in FIG. 19.

When the packing process is started, the packing unit 412 places each patch of each partial point cloud model in a two-dimensional image in step S461.

In step S462, the packing unit 412 generates the occupancy map containing the projection plane information generated in step S423 in FIG. 17.

In step S463, the packing unit 412 performs a dilation process on the color video frame.

When the process in step S463 is completed, the packing process comes to an end, and the process returns to FIG. 16.

As the respective processes are performed as described above, the projection planes can be set independently for each of the plurality of partial point cloud models in a point cloud, and each partial point cloud model can be projected onto more appropriate projection planes. Accordingly, a decrease in coding efficiency due to inefficiency in projection of point cloud models can be prevented (coding efficiency can be increased).

7. Fourth Embodiment

<Decoding Device>

Figure 20:
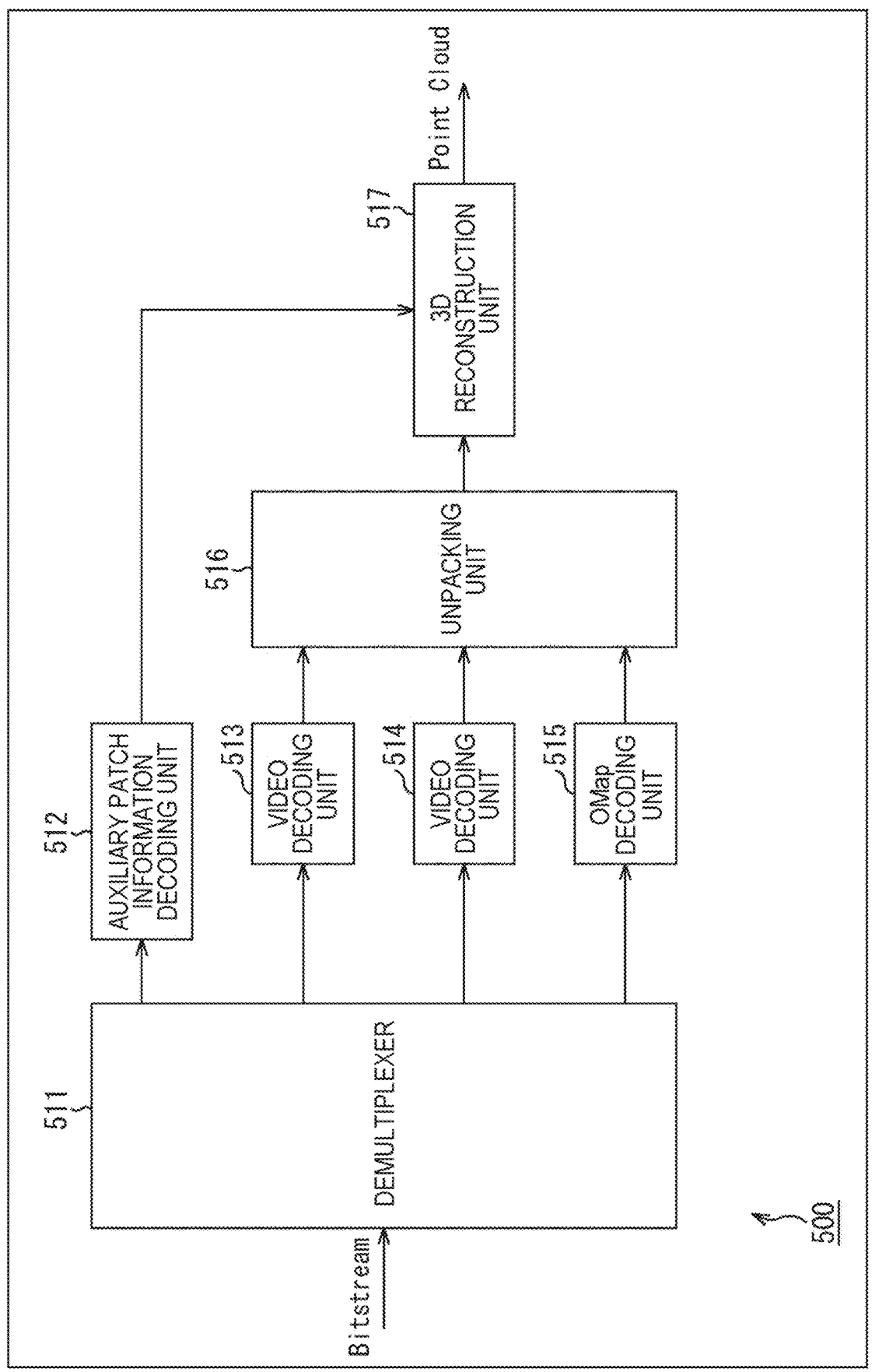
FIG. 20 is a block diagram showing a typical example configuration of a decoding device.

FIG. 20 is a block diagram showing an example configuration of a decoding device as an embodiment of an image processing apparatus to which the present technology is applied. A decoding device 500 shown in FIG. 20 is a device similar to the decoding device 200 (FIG. 10), and is a device (a decoding device to which the video-based approach is applied) that decodes, by a decoding method for two-dimensional images, encoded data generated through projection of 3D data such as a point cloud onto a two-dimensional plane, and projects the resultant data into a three-dimensional space. For example, the decoding device 500 decodes a bitstream the encoding device 400 (FIG. 14) has generated by encoding a point cloud, and reconstructs the point cloud.

Note that FIG. 20 shows the principal components and aspects such as processing units and the data flow, but does not necessarily show every aspect. That is, in the decoding device 500, there may be a processing unit that is not shown as a block in FIG. 20, or there may be a processing or data flow that is not indicated by arrows or the like in FIG. 20. This also applies to the other drawings for explaining the processing units and the like in the decoding device 500.

As shown in FIG. 20, the decoding device 500 includes a demultiplexer 511, an auxiliary patch information decoding unit 512, a video decoding unit 513, a video decoding unit 514, an OMap decoding unit 515, an unpacking unit 516, and a 3D reconstruction unit 517.

The demultiplexer 511 performs a process related to data demultiplexing. For example, the demultiplexer 511 acquires a bitstream input to the decoding device 500. This bitstream is supplied from the encoding device 400, for example. The demultiplexer 511 demultiplexes this bitstream, extracts the encoded data of the auxiliary patch information, and supplies the extracted encoded data to the auxiliary patch information decoding unit 512. The demultiplexer 511 also extracts the encoded data of the geometry video frame from the bitstream through the demultiplexing, and supplies the extracted encoded data to the video decoding unit 513. The demultiplexer 511 further extracts the encoded data of the color video frame from the bitstream through the demultiplexing, and supplies the extracted encoded data to the video decoding unit 514. The demultiplexer 511 also extracts the encoded data of the occupancy map from the bitstream through the demultiplexing, and supplies the extracted encoded data to the OMap decoding unit 515. The demultiplexer 511 further extracts the control information regarding the packing from the bitstream through the demultiplexing, and supplies the extracted control information to the unpacking unit 516.

The auxiliary patch information decoding unit 512 performs a process related to decoding of the encoded data of the auxiliary patch information. For example, the auxiliary patch information decoding unit 512 acquires the encoded data of the auxiliary patch information supplied from the demultiplexer 511. The auxiliary patch information decoding unit 512 also decodes (expands) the encoded data of the auxiliary patch information included in the acquired data. The auxiliary patch information decoding unit 512 supplies the auxiliary patch information obtained through the decoding to the 3D reconstruction unit 517.

The video decoding unit 513 performs a process related to decoding of the encoded data of the geometry video frame. For example, the video decoding unit 513 acquires the encoded data of the geometry video frame supplied from the demultiplexer 511. The video decoding unit 513 decodes the encoded data of the geometry video frame by an appropriate decoding method for two-dimensional images, such as AVC or HEVC, for example. The video decoding unit 513 supplies the geometry video frame (or a region therein) obtained through the decoding, to the unpacking unit 516.

The video decoding unit 514 performs a process related to decoding of the encoded data of the color video frame. For example, the video decoding unit 514 acquires the encoded data of the color video frame supplied from the demultiplexer 511. The video decoding unit 514 decodes the encoded data of the color video frame by an appropriate decoding method for two-dimensional images, such as AVC or HEVC, for example. The video decoding unit 514 supplies the color video frame (or a region therein) obtained through the decoding, to the unpacking unit 516.

The OMap decoding unit 515 performs a process related to decoding of the encoded data of the occupancy map. For example, the OMap decoding unit 515 acquires the encoded data of the occupancy map supplied from the demultiplexer 511. The OMap decoding unit 515 decodes the encoded data of the occupancy map by an appropriate decoding method compatible with the encoding method.

The OMap decoding unit 515 supplies the occupancy map (or a region therein) obtained through the decoding, to the unpacking unit 516.

The unpacking unit 516 performs a process related to unpacking. For example, the unpacking unit 516 acquires the geometry video frame from the video decoding unit 513, the color video frame from the video decoding unit 514, and the occupancy map from the OMap decoding unit 515. The unpacking unit 516 also unpacks the geometry video frame and the color video frame, on the basis of the control information regarding the packing. The unpacking unit 516 supplies the 3D reconstruction unit 517 with the data (geometry patches or the like) of the positional information (Geometry), the data (texture patches or the like) of the attribute information (Texture), the occupancy map, and the like, which have been obtained by the unpacking unit 516 performing the unpacking.

The 3D reconstruction unit 517 performs a process related to reconstruction of the point cloud. For example, the 3D reconstruction unit 517 reconstructs the point cloud, on the basis of the auxiliary patch information supplied from the auxiliary patch information decoding unit 512, and the data (geometry patches or the like) of the positional information (Geometry), the data (texture patches or the like) of the attribute information (Texture), the occupancy map, and the like supplied from the unpacking unit 516.

For example, on the basis of the projection plane information, the 3D reconstruction unit 517 identifies the projection planes corresponding to the respective partial point cloud models, and reconstructs the point cloud from the patches and the like by using the projection planes. Accordingly, the decoding device 500 can reconstruct each partial point cloud model from the patches projected onto more appropriate projection planes. Thus, a decrease in coding efficiency due to inefficiency in the projection of the partial point cloud models can be prevented (coding efficiency can be increased).

The 3D reconstruction unit 517 outputs the reconstructed point cloud to the outside of the decoding device 500. This point cloud is supplied to a display unit and is turned into an image, for example. The image is then displayed, is recorded on a recording medium, or is supplied to another device via communication.

With such a configuration, the decoding device 500 can prevent a decrease in coding efficiency, even when a plurality of partial point cloud model exists in a point cloud.

<Flow in a Decoding Process>

Figure 21:
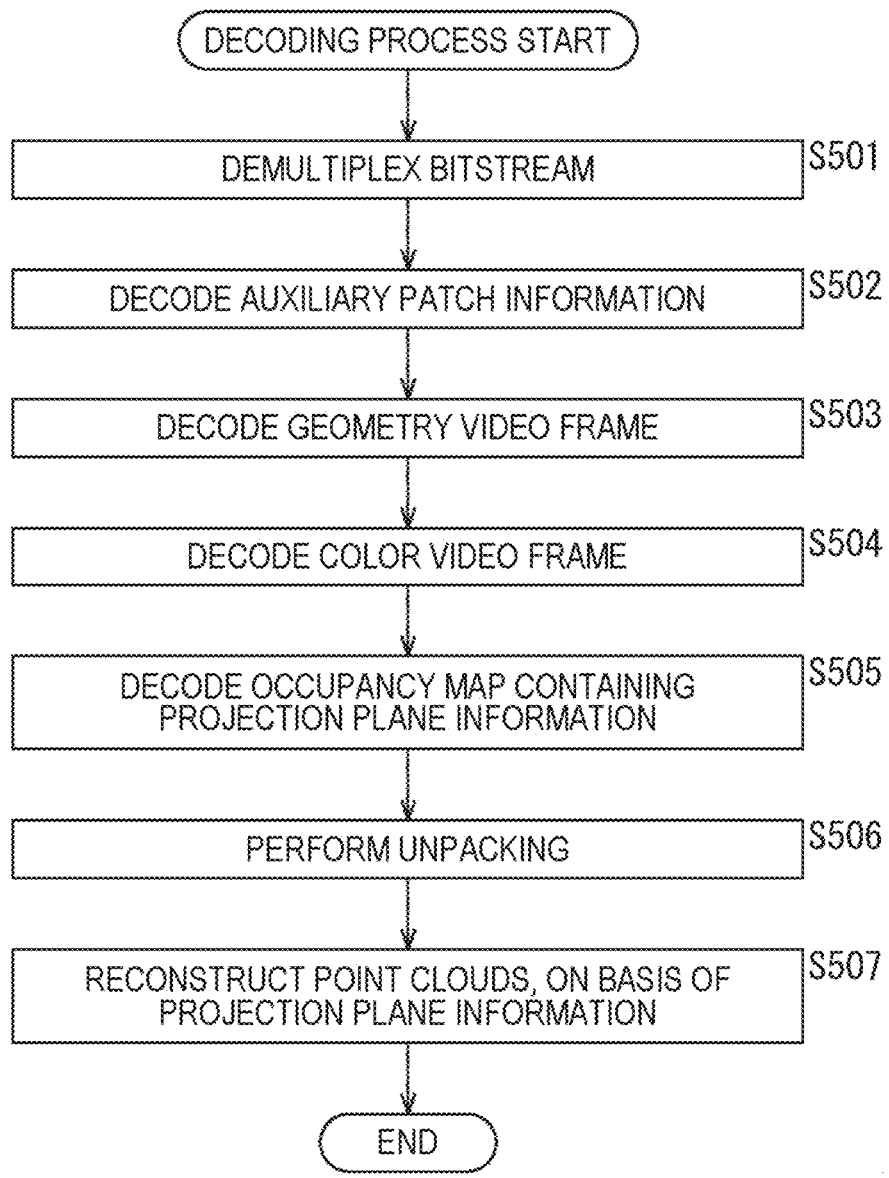
FIG. 21 is a flowchart for explaining an example flow in a decoding process.

Next, an example flow in a decoding process to be performed by the decoding device 500 is described, with reference to the flowchart shown in FIG. 21.

When the decoding process is started, the demultiplexer 511 of the decoding device 500 demultiplexes a bitstream in step S501.

In step S502, the auxiliary patch information decoding unit 512 decodes the auxiliary patch information extracted from the bitstream in step S501.

In step S503, the video decoding unit 513 decodes the encoded data of the geometry video frame (the video frame of the positional information) extracted from the bitstream in step S501.

In step S504, the video decoding unit 514 decodes the encoded data of the color video frame (the video frame of the attribute information) extracted from the bitstream in step S501.

In step S505, the OMap decoding unit 515 decodes the encoded data of the occupancy map extracted from the bitstream in step S501. This occupancy map contains the projection plane information described above.

In step S506, the unpacking unit 516 performs unpacking. For example, the unpacking unit 516 unpacks the geometry video frame obtained from the encoded data decoded in step S503, to generate geometry patches. The unpacking unit 516 also unpacks the color video frame obtained from the encoded data decoded in step S504, to generate texture patches. The unpacking unit 516 further unpacks the occupancy map obtained from the encoded data decoded in step S505, to extract the occupancy map associated with the geometry patches and the texture patches.

In step S507, the 3D reconstruction unit 517 reconstructs the point cloud (each point cloud model), on the basis of the auxiliary patch information obtained in step S502, and the geometry patches, the texture patches, the occupancy map, the projection plane information contained in the occupancy map, and the like obtained in step S506.

When the process in step S507 is completed, the decoding process comes to an end.

By performing the respective processes in the above manner, the decoding device 500 can prevent a decrease in coding efficiency.

8. Notes

<Control Information>

Control information according to the present technology described in each of the above embodiments may be transmitted from the encoding side to the decoding side. For example, control information (enabled flag, for example) for controlling whether or not to allow (or prohibit) application of the present technology described above may be transmitted. Further, control information specifying the range (the upper limit and/or the lower limit of a block size, slices, pictures, sequences, components, views, layers, and the like, for example) in which the present technology described above is allowed (or prohibited) to be applied may be transmitted, for example.

<Computer>

The above described series of processes can be performed by hardware or can be performed by software. When the series of processes are to be performed by software, the program that forms the software is installed into a computer. Here, the computer may be a computer incorporated into special-purpose hardware, or may be a general-purpose personal computer or the like that can execute various kinds of functions when various kinds of programs are installed thereinto, for example.

Figure 22:
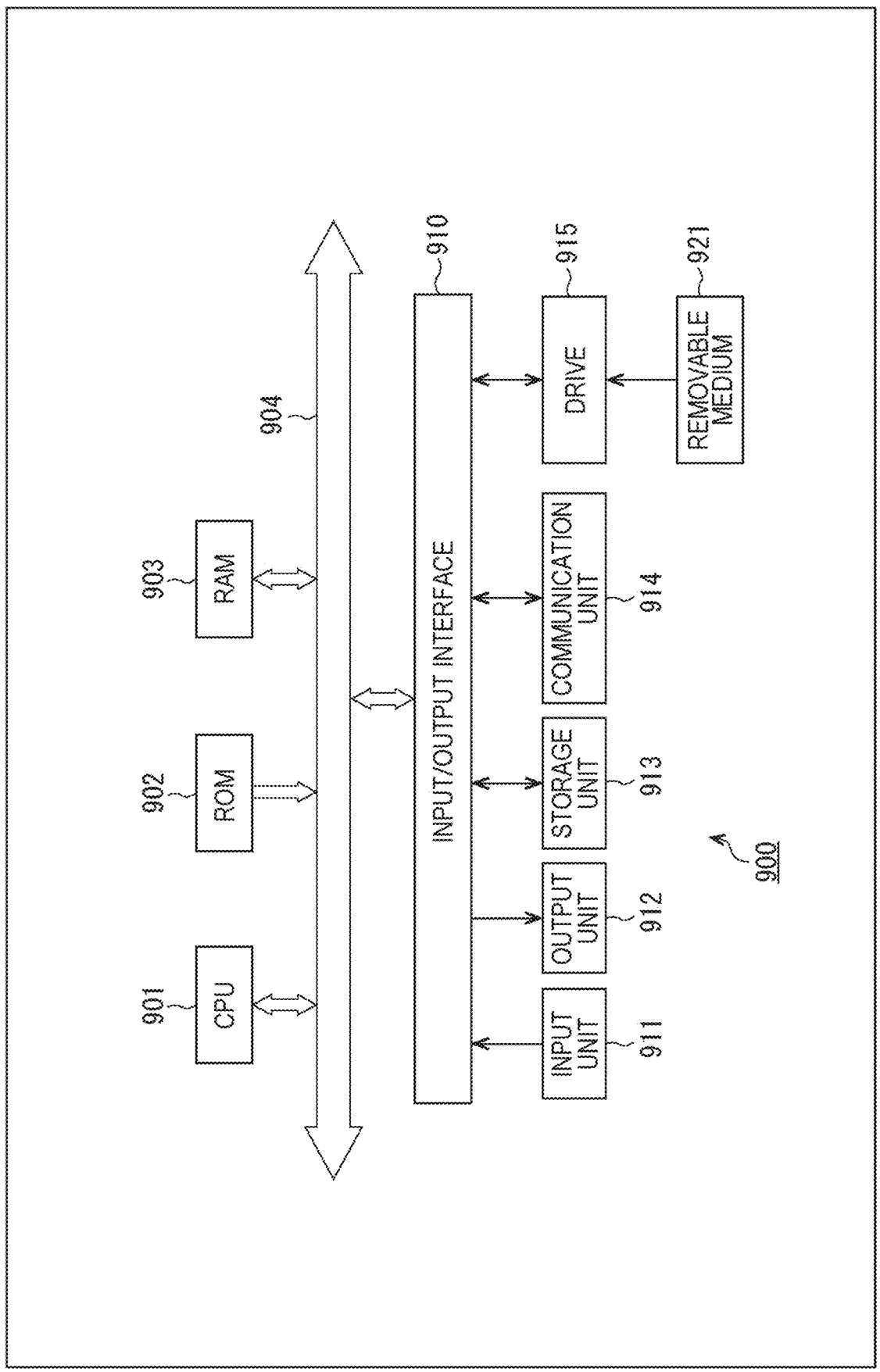
FIG. 22 is a block diagram showing a typical example configuration of a computer.

FIG. 22 is a block diagram showing an example configuration of the hardware of a computer that performs the above described series of processes in accordance with a program.

In a computer 900 shown in FIG. 22, a central processing unit (CPU) 901, a read only memory (ROM) 902, and a random access memory (RAM) 903 are connected to one another by a bus 904.

An input/output interface 910 is also connected to the bus 904. An input unit 911, an output unit 912, a storage unit 913, a communication unit 914, and a drive 915 are connected to the input/output interface 910.

The input unit 911 is formed with a keyboard, a mouse, a microphone, a touch panel, an input terminal, and the like, for example. The output unit 912 is formed with a display, a speaker, an output terminal, and the like, for example. The storage unit 913 is formed with a hard disk, a RAM disk, a nonvolatile memory, and the like, for example. The communication unit 914 is formed with a network interface, for example. The drive 915 drives a removable medium 921 such as a magnetic disk, an optical disk, a magnetooptical disk, or a semiconductor memory.

In the computer having the above described configuration, the CPU 901 loads a program stored in the storage unit 913 into the RAM 903 via the input/output interface 910 and the bus 904, for example, and executes the program, so that the above described series of processes is performed. The RAM 903 also stores data necessary for the CPU 901 to perform various processes and the like as necessary.

The program to be executed by the computer (the CPU 901) may be recorded on the removable medium 921 as a packaged medium or the like to be used, for example. In that case, the program can be installed into the storage unit 913 via the input/output interface 910 when the removable medium 921 is mounted on the drive 915.

Alternatively, this program can be provided via a wired or wireless transmission medium such as a local area network, the Internet, or digital satellite broadcasting. In that case, the program may be received by the communication unit 914, and be installed into the storage unit 913.

Also, this program may be installed beforehand into the ROM 902 or the storage unit 913.

<Targets to which the Present Technology is Applied>

Although cases where the present technology is applied to encoding and decoding of point cloud data have been described so far, the present technology is not limited to those examples, but can be applied to encoding and decoding of 3D data of any standard. That is, various processes such as encoding and decoding processes, and any specifications of various kinds of data such as 3D data and metadata can be adopted, as long as the present technology described above is not contradicted. Also, some of the processes and specifications described above may be omitted, as long as the present technology is not contradicted.

The present technology can be applied to any appropriate configuration. For example, the present technology can be applied to various electronic apparatuses, such as transmitters and receivers (television receivers or portable telephone devices, for example) in satellite broadcasting, cable broadcasting such as cable TV, distribution via the Internet, distribution to terminals via cellular communication, or the like, and apparatuses (hard disk recorders or cameras, for example) that record images on media such as optical disks, magnetic disks, and flash memory, and reproduce images from these storage media, for example.

The present technology can also be embodied as a component of an apparatus, such as a processor (a video processor, for example) serving as a system LSI (Large Scale Integration) or the like, a module (a video module, for example) using a plurality of processors or the like, a unit (a video unit, for example) using a plurality of modules or the like, or a set (a video set, for example) having other functions added to units.

The present technology can also be applied to a network system formed with a plurality of devices, for example. For example, the present technology may be embodied as cloud computing that is shared and jointly processed by a plurality of devices via a network. For example, the present technology may be embodied in a cloud service that provides services related to images (video images) to any kinds of terminals such as computers, audio video (AV) devices, portable information processing terminals, and IoT (Internet of Things) devices.

Note that, in the present specification, a system means an assembly of plurality of components (devices, modules (parts), and the like), and not all the components need to be provided in the same housing. In view of this, plurality of devices that are housed in different housings and are connected to one another via a network form a system, and one device having plurality of modules housed in one housing is also a system.

<Fields and Usage to which the Present Technology can be Applied>

A system, an apparatus, a processing unit, and the like to which the present technology is applied can be used in any appropriate field such as transportation, medical care, crime prevention, agriculture, the livestock industry, mining, beauty care, factories, household appliances, meteorology, or nature observation, for example. The present technology can also be used for any appropriate purpose.

<Other Aspects>

Note that, in this specification, a "flag" is information for identifying a plurality of states, and includes not only information to be used for identifying two states of true (1) or false (0), but also information for identifying three or more states. Therefore, the values this "flag" can have may be the two values of "1" and "0", for example, or three or more values. That is, this "flag" may be formed with any number of bits, and may be formed with one bit or a plurality of bits. Further, as for identification information (including a flag), not only the identification information but also difference information about the identification information with respect to reference information may be included in a bitstream. Therefore, in this specification, a "flag" and "identification information" include not only the information but also difference information with respect to the reference information.

Further, various kinds of information (such as metadata) regarding encoded data (a bitstream) may be transmitted or recorded in any mode that is associated with the encoded data. Here, the term "to associate" means to enable use of other data (or a link to other data) while data is processed, for example. That is, pieces of data associated with each other may be integrated as one piece of data, or may be regarded as separate pieces of data. For example, information associated with encoded data (an image) may be transmitted through a transmission path different from the encoded data (image). Further, information associated with encoded data (an image) may be recorded in a recording medium different from the encoded data (image) (or in a different recording area of the same recording medium), for example. Note that this "association" may apply to some of the data, instead of the entire data. For example, an image and the information corresponding to the image may be associated with each other for any appropriate unit, such as for a plurality of frames, each frame, or some portion in each frame.

Note that, in this specification, the terms "to combine", "to multiplex", "to add", "to integrate", "to include", "to store", "to contain", "to incorporate, "to insert", and the like mean combining a plurality of objects into one, such as combining encoded data and metadata into one piece of data, for example, and mean a method of the above described "association".

Further, embodiments of the present technology are not limited to the above described embodiments, and various modifications may be made to them without departing from the scope of the present technology.

For example, any configuration described above as one device (or one processing unit) may be divided into a plurality of devices (or processing units). Conversely, any configuration described above as a plurality of devices (or processing units) may be combined into one device (or one processing unit). Furthermore, it is of course possible to add a component other than those described above to the configuration of each device (or each processing unit). Further, some components of a device (or processing unit) may be incorporated into the configuration of another device (or processing unit) as long as the configuration and the functions of the entire system remain substantially the same.

Also, the program described above may be executed in any device, for example. In that case, the device is only required to have necessary functions (function blocks and the like) so that necessary information can be obtained.

Also, one device may carry out each step in one flowchart, or a plurality of devices may carry out each step, for example. Further, when one step includes a plurality of processes, the plurality of processes may be performed by one device or may be performed by a plurality of devices. In other words, a plurality of processes included in one step may be performed as processes in a plurality of steps. Conversely, processes described as a plurality of steps may be collectively performed as one step.

Also, a program to be executed by a computer may be a program for performing the processes in the steps according to the program in chronological order in accordance with the sequence described in this specification, or may be a program for performing processes in parallel or performing a process when necessary, such as when there is a call, for example. That is, as long as there are no contradictions, the processes in the respective steps may be performed in a different order from the above described order. Further, the processes in the steps according to this program may be executed in parallel with the processes according to another program, or may be executed in combination with the processes according to another program.

Also, each of the plurality of techniques according to the present technology can be independently implemented, as long as there are no contradictions, for example. It is of course also possible to implement a combination of some of the plurality of techniques according to the present technology. For example, part or all of the present technology described in one of the embodiments may be implemented in combination with part or all of the present technology described in another one of the embodiments. Further, part or all of the present technology described above may be implemented in combination with some other technology not described above.

REFERENCE SIGNS LIST

100 Encoding device
111 Model transform unit
112 Patch separation unit
113 Packing unit
114 Auxiliary patch information compression unit
115 Video encoding unit
116 Video encoding unit
117 OMap encoding unit
118 Multiplexer
119 BB information generation unit
200 Decoding device
211 Demultiplexer
212 Auxiliary patch information decoding unit
213 Point cloud model selection unit
214 Video decoding unit
215 Video decoding unit
216 OMap decoding unit
217 Unpacking unit
218 3D reconstruction unit
400 Encoding device
411 Patch separation unit
412 Packing unit
413 Auxiliary patch information compression unit
414 Video encoding unit
415 Video encoding unit
416 OMap encoding unit
417 Multiplexer
431 Model dividing unit
432 Partial point cloud model projection plane setting unit
433 Projection plane information generation unit
434 Partial point cloud model projection unit
435 Projection plane information adding unit
500 Decoding device
511 Demultiplexer
512 Auxiliary patch information decoding unit
513 Video decoding unit
514 Video decoding unit
515 OMap decoding unit
516 Unpacking unit
517 3D reconstruction unit

The invention claimed is:

1. An image encoding apparatus comprising:
 circuitry configured to:
  shift, into a single encoding bounding box in a three-dimensional coordinate system of a point cloud, a first point cloud model and a second point cloud model apart from each other in the three-dimensional coordinate system, to make the first point cloud model and the second point cloud model closer to one another than before the shift;
  generate transform information representing a parameter of the shifting;
  project the first point cloud model and the second point cloud model, which are shifted in the single encoding bounding box, onto a plurality of projection planes of the encoding bounding box to generate a plurality of patches representing the first point cloud model and the second point cloud model;
  place the plurality of patches into a two-dimensional image, to pack the plurality of patches as a video frame;
  encode the video frame of the plurality of patches; and
  multiplex the encoded video frame of the plurality of patches and the transform information representing the parameter of the shifting.

2. The image encoding apparatus according to claim 1, wherein
 the circuitry is further configured to rotate a first coordinate of the first point cloud model and a second coordinate of the second point cloud model with respect to the encoding bounding box in the three-dimensional coordinate system to make postures of the first and second point cloud models uniform, and
 the transform information further represents a parameter of the rotating.

3. The image encoding apparatus according to claim 1, wherein
 the first point cloud model and the second point cloud model respectively have a first time stamp and a second time stamp different from each other,
 the transform information further represents a parameter of the first time stamp and the second time stamp, and
 the circuitry is further configured to add the transform information into a header of a bitstream of the single encoding bounding box.

4. The image encoding apparatus according to claim 1, wherein the transform information further represents a parameter of respective scales of the first point cloud model and second point cloud model.

5. The image encoding apparatus according to claim 1, wherein the transform information further represents a parameter of respective frame rates of the first point cloud model and second point cloud model.

6. An image encoding method comprising:
shifting, into a single encoding bounding box in a three-dimensional coordinate system of a point cloud, a first point cloud model and a second point cloud model apart from each other in the three-dimensional coordinate system, to make the first point cloud model and the second point cloud model closer to one another than before shifting;
generating transform information representing a parameter of the shifting;
projecting the first point cloud model and the second point cloud model, which are shifted in the single encoding bounding box, onto a plurality of projection planes of the encoding bounding box to generate a plurality of patches representing the first point cloud model and the second point cloud model;
placing the plurality of patches into a two-dimensional image, to pack the plurality of patches as a video frame;
encoding the video frame of the plurality of patches; and
multiplexing the encoded video frame of the plurality of patches and the transform information representing the parameter of the shifting.

7. An image decoding apparatus comprising
circuitry configured to:
demultiplex a bitstream containing
transform information representing a parameter of shifting a first point cloud model and a second point cloud model apart from each other in a three-dimensional coordinate system of a point cloud into a single encoding bounding box to make the first point cloud model and the second point cloud model closer to one another than before the shift; and
an encoded video frame of a plurality of patches packed into a two-dimensional image, the plurality of patches being generated by projecting the first point cloud model and the second point cloud model shifted into the single encoding bounding box onto a plurality of projection planes;
decode the encoded video frame of the plurality of patches, and the transform information;
unpack the plurality of patches into a two-dimensional image; and
reconstruct, based on the two-dimensional image and transform information, the first point cloud model and the second point cloud model in their original relative positions.

8. An image decoding method comprising:
demultiplexing a bitstream containing
transform information representing a parameter of shifting a first point cloud model and a second point cloud model apart from each other in a three-dimensional coordinate system of a point cloud into a single encoding bounding box to make the first point cloud model and the second point cloud model closer to one another than before the shift; and
an encoded video frame of a plurality of patches packed into a two-dimensional image, the plurality of patches being generated by projecting the first point cloud model and the second point cloud model shifted into the single encoding bounding box onto a plurality of projection planes;
decoding the encoded video frame of the plurality of patches, and the transform information;
unpacking the plurality of patches into a two-dimensional image; and
reconstructing, based on the two-dimensional image and transform information, the first point cloud model and the second point cloud model in their original relative positions.

* * * * *